(12) United States Patent
Chen et al.

(10) Patent No.: US 11,160,074 B2
(45) Date of Patent: *Oct. 26, 2021

(54) RESOURCE MANAGEMENT FOR LOW LATENCY WIRELESS COMMUNICATIONS

(71) Applicant: QUALCOMM Incorporated, San Diego, CA (US)

(72) Inventors: Wanshi Chen, San Diego, CA (US); Seyekianoush Hosseini, San Diego, CA (US); Xipeng Zhu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/710,892

(22) Filed: Dec. 11, 2019

(65) Prior Publication Data

US 2020/0120669 A1 Apr. 16, 2020

Related U.S. Application Data

(63) Continuation of application No. 15/887,849, filed on Feb. 2, 2018, now Pat. No. 10,531,453.

(Continued)

(51) Int. Cl.
*H04W 72/04* (2009.01)
*H04L 5/00* (2006.01)
(Continued)

(52) U.S. Cl.
CPC ........ *H04W 72/0446* (2013.01); *H04L 5/001* (2013.01); *H04L 5/0032* (2013.01);
(Continued)

(58) Field of Classification Search
None
See application file for complete search history.

(56) References Cited

U.S. PATENT DOCUMENTS 7,860,052 B2 12/2010 Lohr et al.
8,576,765 B2 11/2013 Shimada et al.
(Continued)

FOREIGN PATENT DOCUMENTS

EP 3413638 A1 12/2018
EP 3570599 A1 11/2019
(Continued)

OTHER PUBLICATIONS

International Preliminary Report on Patentability—PCT/US2018/016871, The International Bureau of WIPO—Geneva, Switzerland, Aug. 15, 2019.

(Continued)

*Primary Examiner* — Otis L Thompson, Jr.
(74) *Attorney, Agent, or Firm* — Holland & Hart LLP

(57) ABSTRACT

Described techniques provide for low latency transmission time interval (TTI) transmissions that may have reduced likelihood of experiencing interference from one or more neighboring transmitters. A base station may configure two or more sets of resources for two or more sets of wireless transmissions, in which low latency transmissions may be transmitted in a set of wireless transmissions using all or a portion of one of the sets of resources. The set of resources available for the low latency transmissions may be associated with a set of power parameters that provide reduced transmission powers relative to one or more of the other sets of resources. The two or more sets of resources may include one or more sub-bands of available frequency resources, one or more subsets of time resources, or combinations thereof. In some cases, neighboring base stations may coordinate sets of resources that have reduced power parameters.

62 Claims, 19 Drawing Sheets

Related U.S. Application Data

(60) Provisional application No. 62/455,404, filed on Feb. 6, 2017.

(51) Int. Cl.

| | | |
|---|---|---|
| *H04W 52/36* | (2009.01) | |
| *H04W 52/42* | (2009.01) | |
| *H04W 52/14* | (2009.01) | |
| *H04L 27/26* | (2006.01) | |
| *H04W 52/16* | (2009.01) | |

(52) U.S. Cl.
CPC .......... *H04L 5/0037* (2013.01); *H04L 5/0044* (2013.01); *H04L 5/0048* (2013.01); *H04L 5/0092* (2013.01); *H04W 52/146* (2013.01); *H04W 52/367* (2013.01); *H04W 52/42* (2013.01); *H04L 27/2601* (2013.01); *H04W 52/16* (2013.01)

(56) References Cited

U.S. PATENT DOCUMENTS

| | | |
|---|---|---|
| 9,282,567 B2 | 3/2016 | Golitschek et al. |
| 2012/0076089 A1 | 3/2012 | Kawamura et al. |
| 2013/0163540 A1* | 6/2013 | Roh .................... H04W 72/085 370/329 |
| 2014/0126530 A1 | 5/2014 | Siomina et al. |
| 2016/0066288 A1 | 3/2016 | Feng et al. |
| 2016/0119948 A1 | 4/2016 | Damnjanovic et al. |
| 2016/0323887 A1 | 11/2016 | Patel et al. |
| 2017/0290008 A1 | 10/2017 | Tooher et al. |
| 2018/0077719 A1 | 3/2018 | Nory et al. |
| 2018/0077721 A1* | 3/2018 | Nory .................. H04W 72/1263 |
| 2018/0103428 A1 | 4/2018 | Jiang et al. |
| 2018/0124711 A1 | 5/2018 | Hosseini et al. |
| 2018/0146440 A1 | 5/2018 | Hosseini et al. |
| 2018/0220441 A1 | 8/2018 | Akula et al. |
| 2018/0227912 A1 | 8/2018 | Chen et al. |
| 2019/0036676 A1 | 1/2019 | Takeda et al. |
| 2019/0045394 A1 | 2/2019 | Takano |
| 2019/0098622 A1 | 3/2019 | Lee et al. |
| 2019/0109746 A1 | 4/2019 | Hosseini et al. |
| 2019/0159138 A1 | 5/2019 | Lee et al. |
| 2019/0174430 A1 | 6/2019 | Gao et al. |
| 2019/0230601 A1 | 7/2019 | Falconetti et al. |
| 2019/0230695 A1 | 7/2019 | Takeda et al. |
| 2019/0239196 A1 | 8/2019 | Lee et al. |
| 2019/0373567 A1* | 12/2019 | Takeda .................. H04W 52/34 |
| 2020/0169958 A1* | 5/2020 | Lee ........................ H04W 52/38 |

FOREIGN PATENT DOCUMENTS

| | | |
|---|---|---|
| WO | WO-2017079530 A1 | 5/2017 |
| WO | WO-2017142029 A1 | 8/2017 |
| WO | WO-2018131675 A1 | 7/2018 |

OTHER PUBLICATIONS

International Search Report and Written Opinion—PCT/US2018/016871—ISA/EPO—Jun. 8, 2018.

ITRI: "Discussion on CA System Supporting sTTI Operation", 3GPP Draft, R1-1612194, 3GPP TSG RAN WG1 Meeting #87, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016 (Nov. 13, 2016), XP051176146, pp. 1-4, Retrieved from the Internet: URL:http://www.3gpp.org/ftp/Meetings_3GPP_SYNC/RAN1/Docs/ [retrieved on Nov. 13, 2016].

Panasonic: "UL Simultaneous Transmission Between sTTI and TTI", 3GPP Draft, R1-1701934, 3GPP TSG RAN WG1 Meeting #88, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13, 2017-Feb. 17, 2017, Feb. 3, 2017 (Feb. 3, 2017), XP051220174, pp. 1-3, Retrieved from the Internet: URL:http://www.3gpp.org/ftp/tsg_ran/WG1_RL1/TSGR1_88/Docs/ [retrieved on Feb. 3, 2017].

Taiwan Search Report—TW107103967—TIPO—dated Jul. 20, 2021.

* cited by examiner

RESOURCE MANAGEMENT FOR LOW LATENCY WIRELESS COMMUNICATIONS

CROSS REFERENCES

The present application for patent is a continuation of U.S. patent application Ser. No. 15/887,849 by Chen et al., entitled "Resource Management For Low Latency Wireless Communications" filed Feb. 2, 2018, which claims priority to U.S. Provisional Patent Application No. 62/455,404 by Chen et al., entitled "Resource Management For Low Latency Wireless Communications," filed Feb. 6, 2017, assigned to the assignee hereof, and which is hereby expressly incorporated by reference herein in its entirety.

BACKGROUND

The following relates generally to wireless communication, and more specifically to resource management for low latency wireless communications.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use orthogonal frequency division multiple access (OFDMA) on the downlink (DL), single-carrier frequency division multiple access (SC-FDMA) on the uplink (UL), and multiple-input multiple-output (MIMO) antenna technology.

In some examples, a wireless multiple-access communications system may include a number of base stations, each simultaneously supporting communications for multiple communications devices, otherwise known as user equipment (UEs). In a LTE or LTE-Advanced (LTE-A) network, a set of one or more base stations may define an eNodeB (eNB). In other examples (e.g., in a next generation new radio (NR) or 5G network), a wireless multiple access communications system may include a number of smart radio heads (RHs) in communication with a number of access node controllers (ANCs), where a set of one or more RHs, in communication with an ANC, defines a base station (e.g., an eNB or gNB). A base station may communicate with a set of UEs on DL channels (i.e., for transmissions from a base station to a UE) and UL channels (i.e., for transmissions from a UE to a base station).

A base station in some LTE or NR deployments may transmit to one or more UEs using different length transmission time intervals (TTIs) that may be reduced in length relative to some TTIs (e.g., legacy or LTE TTIs). Such a reduced length TTI may be referred to as a shortened TTI (sTTI) and may support some low latency services that provide low latency with high reliability for wireless transmissions of the low latency services. An sTTI may be a subset of one or more subframes that correspond to legacy TTI subframes. A base station may allocate transmission resources for sTTIs to a UE that may include time resources and frequency resources. In some cases, reliability of sTTI transmissions may be enhanced relative to other non-low latency transmissions, and thus sTTI transmissions may be more sensitive to interference.

SUMMARY

The described techniques relate to improved methods, systems, devices, or apparatuses that support resource management for low latency communications. Generally, the described techniques provide for low latency transmission time interval (TTI) transmissions that may have reduced likelihood of experiencing interference from one or more neighboring transmitters. A base station may configure two or more sets of resources for two or more sets of wireless transmissions, in which low latency transmissions may be transmitted in a set of wireless transmissions using all or a portion of one of the sets of resources. In some cases, the set of resources available for the low latency transmissions may be associated with a set of power parameters that provide reduced transmission powers relative to one or more of the other sets of resources. The two or more sets of resources may include one or more sub-bands of available frequency resources, one or more subsets of time resources, or combinations thereof. In some cases, neighboring base stations may coordinate sets of resources that have reduced power parameters.

A method of wireless communications is described. The method may include identifying a first set of power parameters associated with a first set of resources for a first set of wireless transmissions, the first set of wireless transmissions having a first duration TTI, receiving signaling indicating a second set of resources for at least a first subset of a second set of wireless transmissions, the second set of wireless transmissions having a second duration TTI that is shorter than the first duration TTI, and the second set of resources associated with a second set of power parameters providing reduced power relative to the first set of power parameters, transmitting the first set of wireless transmissions using the first set of resources according to the first set of power parameters, and transmitting the at least the first subset of the second set of wireless transmissions using the second set of resources according to the second set of power parameters.

An apparatus for wireless communications is described. The apparatus may include means for identifying a first set of power parameters associated with a first set of resources for a first set of wireless transmissions, the first set of wireless transmissions having a first duration TTI, means for receiving signaling indicating a second set of resources for at least a first subset of a second set of wireless transmissions, the second set of wireless transmissions having a second duration TTI that is shorter than the first duration TTI, and the second set of resources associated with a second set of power parameters providing reduced power relative to the first set of power parameters, means for transmitting the first set of wireless transmissions using the first set of resources according to the first set of power parameters, and means for transmitting the at least the first subset of the second set of wireless transmissions using the second set of resources according to the second set of power parameters.

Another apparatus for wireless communications is described. The apparatus may include a processor, memory in electronic communication with the processor, and instructions stored in the memory. The instructions may be operable to cause the processor to identify a first set of power parameters associated with a first set of resources for a first set of wireless transmissions, the first set of wireless transmissions having a first duration TTI, receive signaling indicating a second set of resources for at least a first subset of a second set of wireless transmissions, the second set of wireless transmissions having a second duration TTI that is shorter than the first duration TTI, and the second set of resources associated with a second set of power parameters providing reduced power relative to the first set of power parameters, transmit the first set of wireless transmissions using the first set of resources according to the first set of power parameters, and transmit the at least the first subset of the second set of wireless transmissions using the second set of resources according to the second set of power parameters.

A non-transitory computer readable medium for wireless communications is described. The non-transitory computer-readable medium may include instructions operable to cause a processor to identify a first set of power parameters associated with a first set of resources for a first set of wireless transmissions, the first set of wireless transmissions having a first duration TTI, receive signaling indicating a second set of resources for at least a first subset of a second set of wireless transmissions, the second set of wireless transmissions having a second duration TTI that is shorter than the first duration TTI, and the second set of resources associated with a second set of power parameters providing reduced power relative to the first set of power parameters, transmit the first set of wireless transmissions using the first set of resources according to the first set of power parameters, and transmit the at least the first subset of the second set of wireless transmissions using the second set of resources according to the second set of power parameters.

DETAILED DESCRIPTION

Figure 1:
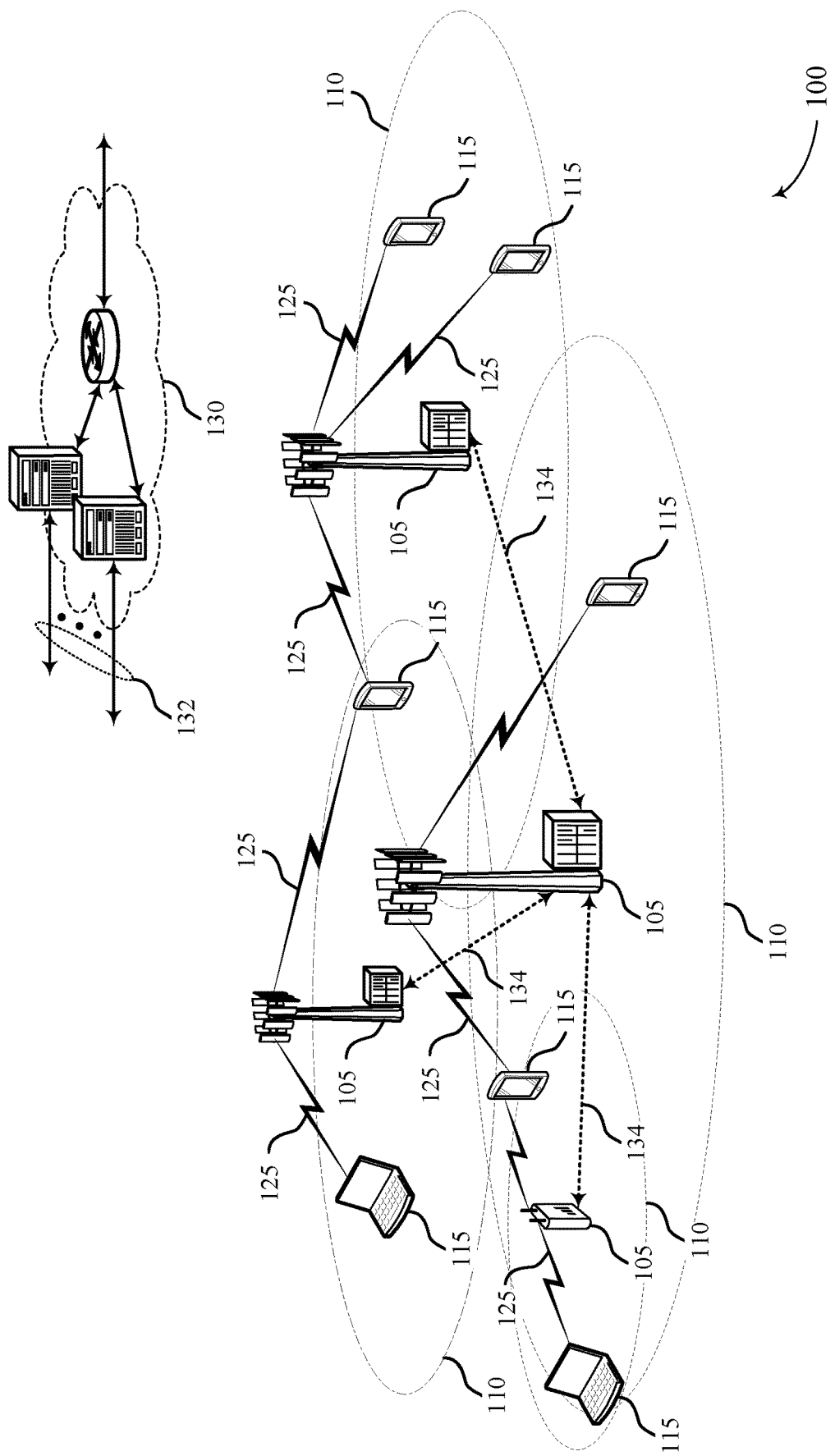
FIG. 1 illustrates an example of a system for wireless communications that supports resource management for low latency wireless communications in accordance with aspects of the present disclosure.

The described techniques relate to improved methods, systems, devices, or apparatuses that support resource management for low latency communications that may provide for sets of resources that may have different power parameters to enhance the reliability of some low latency transmissions. Some transmissions may use shortened transmission time intervals TTIs (sTTIs) for uplink or downlink transmissions, in which a length of the sTTI may be shorter than a legacy Long Term Evolution (LTE) subframe or a 1 ms transmission time interval (TTI). In some cases, a base station may configure a first set of resources having a first set of power parameters, and a second set of resources having a second set of power parameters that are reduced relative to the first set of power parameters. The base station may coordinate with one or more neighboring base stations, such that each of the base stations configures the second set of resources with the second set of power parameters. Low latency transmissions may be transmitted using the second set of resources, and may accordingly have reduced inter-cell interference from transmissions of neighboring base station relative to potential inter-cell interference of transmissions using the first set of resources. The second set of resources may include one or more sub-bands of available frequency resources, one or more subsets of time resources, or combinations thereof.

While various examples provided herein provide that the second set of resources have the second set of power parameters that are reduced relative to the first set of power parameters, the principles provided herein also apply to cases where the second set of resources have power parameters that are increased relative to the first set of power parameters, and techniques as discussed herein may be used to provide the second set of resources having power parameters that are increased relative to the first set of power parameters.

Resources allocated for sTTI transmissions may be used for uplink and/or downlink communications that are relatively latency sensitive, referred to as low latency communications, relative to communications that may be relatively latency insensitive, such as enhanced mobile broadband (eMBB) transmissions that may use a 1 ms (or legacy LTE) TTI duration. In some cases, an sTTI duration may correspond to one slot of a wireless subframe, or to two or three orthogonal frequency division multiplexing (OFDM) symbols, for example; and a 1 ms TTI duration may correspond to a duration of a 1 ms subframe.

Such low latency communications may be used in systems, for example, that may support multiple different services for data communications. Such different services may be selected depending upon the nature of the communications. For example, communications that require low latency and high reliability, sometimes referred to as mission critical (MiCr) communications, may be served through a lower-latency service (e.g., an ultra-reliable low-latency communication (URLLC) service) that uses sTTIs. Correspondingly, communications that are more delay-tolerant may be served through a service that provides relatively higher throughput with somewhat higher latency, such as a mobile broadband service (e.g., an eMBB service) that uses 1 ms TTIs. In other examples, communications may be with user equipments (UEs) that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different subcarrier (or tone) spacing and different cyclic prefixes.

The present disclosure describes various techniques with reference to 4G networks (e.g., LTE networks) and next generation networks (e.g., 5G or NR networks) that are being designed to support features such as high bandwidth operations, more dynamic subframe/slot types, and self-contained subframe/slot types (in which Hybrid ARQ (HARQ) feedback for a subframe/slot may be transmitted before the end of the subframe/slot). However, such techniques may be used for any system in which TTIs of different lengths may be transmitted in a wireless communications system.

The described techniques described in various examples provide for identifying a first set of power parameters associated with a first set of resources for a first set of wireless transmissions, the first set of wireless transmissions having a first duration TTI, which may be a 1 ms TTI. Signaling may be provided from a base station to a UE that may indicate a second set of resources for at least a first subset of a second set of sTTI wireless transmissions. The second set of resources may be associated with a second set of power parameters providing reduced power relative to the first set of power parameters. A transmitter, such as a UE or a base station, may transmit the first set of wireless transmissions using the first set of resources according to the first set of power parameters, and transmit at least the first subset of the second set of wireless transmissions using the second set of resources according to the second set of power parameters.

In some cases, transmissions of the second set of transmissions that use resources of the second set of resources may experience a reduced likelihood, or a reduced amount, of inter-cell interference and thus have a higher likelihood of successful reception at a receiver. Thus, techniques as discussed herein may provide relatively higher reliability, which may help to achieve reliability with error rates of $10^{-5}$ within a 1 ms time period for 32 byte packets as is being targeted in some 4G and 5G systems.

Aspects of the disclosure are initially described in the context of a wireless communications system. Various sTTI structures and sets of resources are then described. Aspects of the disclosure are further illustrated by and described with reference to apparatus diagrams, system diagrams, and flowcharts that relate to resource management for low latency wireless communications.

FIG. 1 illustrates an example of a wireless communications system 100 that supports resource management for low latency wireless communications in accordance with aspects of the present disclosure. The wireless communications system 100 includes base stations 105, UEs 115, and a core network 130. In some examples, the wireless communications system 100 may be a LTE (or LTE-Advanced (LTE-A)) network, or a New Radio (NR) network. In some cases, wireless communications system 100 may support enhanced broadband communications, ultra-reliable (i.e., mission critical or URLLC) communications, low latency communications, and communications with low-cost and low-complexity devices. Wireless communications system 100 may provide for wireless transmissions in which sTTI structures and resource power management may allow for higher reliability sTTI transmissions.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communications device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a MTC device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one S-GW, and at least one P-GW. The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as a base station 105 may include subcomponents such as an access network entity, which may be an example of an access node controller (ANC). Each access network entity may communicate with a number of UEs 115 through one or more access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a network device or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms (Tr=307200 $T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe (e.g., a sTTI) or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period, which may be referred to as a modulation and coding scheme (MCS)). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier,"

"component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology (NR-SS) in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with CCs operating in a licensed band. Operations in unlicensed spectrum may include downlink transmissions, uplink transmissions, or both. Duplexing in unlicensed spectrum may be based on FDD, TDD or a combination of both.

As indicated above, in some cases base stations 105 and UEs 115 may use two or more sets of resources for wireless transmissions. In some cases, a first set of power parameters may be associated with the first set of wireless resources, and a second set of power parameters may be associated with the second set of wireless resources, the second set of power parameters providing reduced transmit powers relative to the first set of power parameters. Neighboring base stations may coordinate such that each of the base stations configures the second set of resources with reduced power transmissions relative to one or more other sets of resources. Low latency transmissions may be transmitted using the second set of resources, and may thus have reduced inter-cell interference from transmissions of neighboring base station relative to potential inter-cell interference of transmissions using the first set of resources. The second set of resources may include one or more sub-bands of available frequency resources, one or more subsets of time resources, or combinations thereof.

Figure 2:
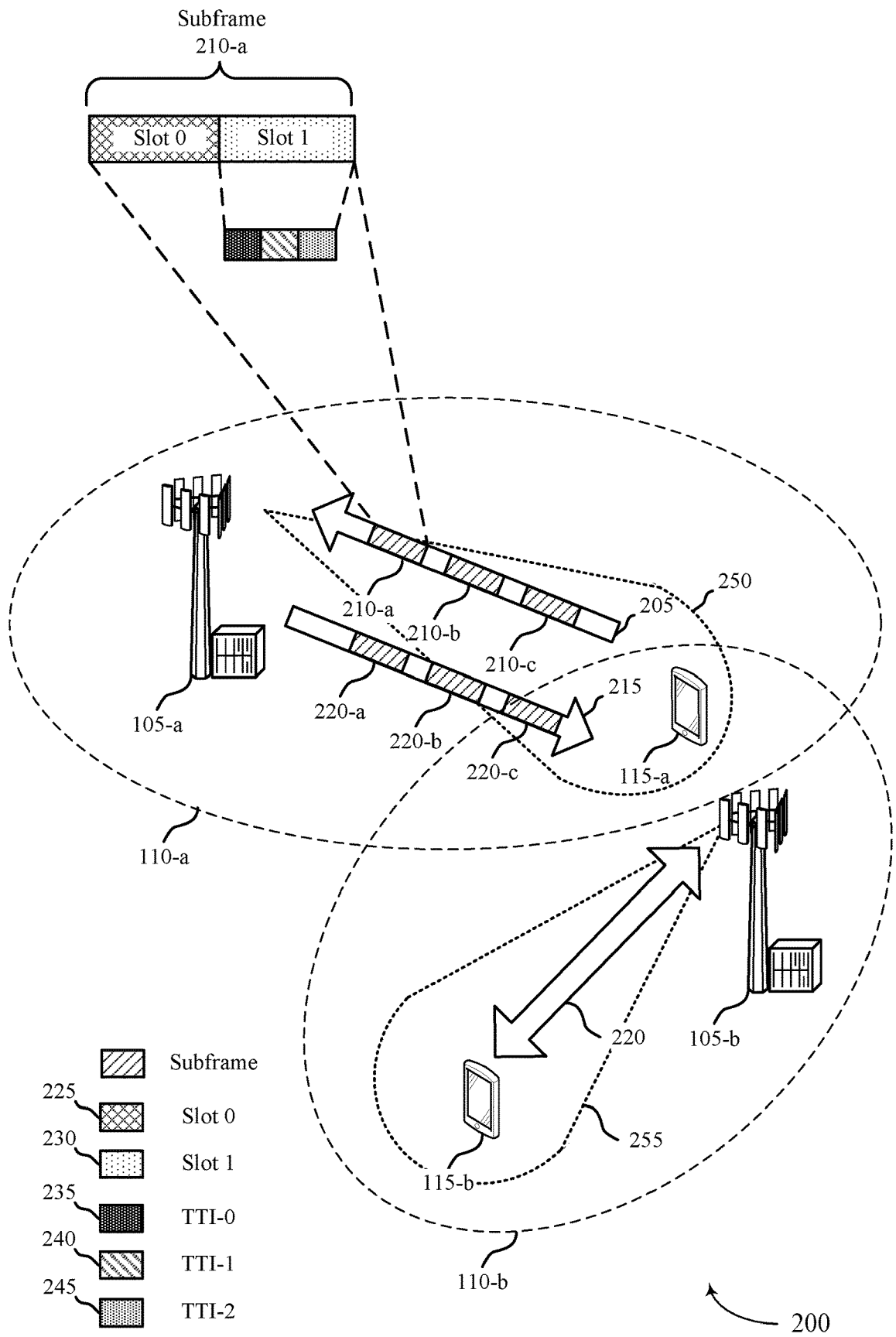
FIG. 2 illustrates an example of a wireless communications system that supports resource management for low latency wireless communications in accordance with aspects of the present disclosure.

FIG. 2 illustrates an example of a wireless communications system 200 that supports resource management for low latency wireless communications in accordance with aspects of the present disclosure. Wireless communications system 200 includes a first base station 105-a, a second base station 105-b, a first UE 115-a, and a second UE 115-b, which may be examples of aspects of a base station 105 or UE 115 as described with reference to FIG. 1. In the example of FIG. 2, the wireless communications system 200 may operate according to a radio access technology (RAT) such as a LTE, 5G, or NR RAT, although techniques described herein may be applied to any RAT and to systems that may concurrently use two or more different RATs.

The first base station 105-a may communicate with first UE 115-a and one or more other UEs within a first geographic coverage area 110-a of the first base station 105-a over an uplink carrier 205 and a downlink carrier 215. The second base station 105-b may communicate with second UE 115-b and one or more other UEs within a second geographic coverage area 110-b of the second base station 105-b over link 220. Link 220 may include uplink and downlink carriers, which may carry transmissions using 1 ms TTIs and sTTIs in a similar manner as discussed with respect to uplink carrier 205 and downlink carrier 215.

In some examples, the first base station 105-a may allocate resources for communication with UEs over uplink carrier 205 and downlink carrier 215. For example, first base station 105-a may allocate uplink subframes 210 in uplink carrier 205 for uplink transmissions from first UE 115-a, and one or more uplink subframes 210 may correspond to a legacy LTE TTI of 1 ms. In this example, uplink subframes 210 may include a first uplink subframe 210-a, a second uplink subframe 210-b, and a third uplink subframe 210-c. Each of the uplink subframes 210 may include two slots, in which each slot may have seven OFDM symbols for a normal cyclic prefix. In this example, a first slot (slot 0) 225 and a second slot (slot 1) 230 may be included in the first subframe 210-a. Similarly, first base station 105-a may allocate downlink subframes 218 in downlink carrier 215 for downlink transmissions to first UE 115-a. In this example, downlink subframes 218 may include a first downlink subframe 218-a, a second downlink subframe 218-b, and a third downlink subframe 218-c.

As indicated above, in the uplink of a low latency system, different sTTI lengths may be used for transmissions over uplink carrier 205. For example, two-symbol sTTI and 1-slot sTTI durations may be supported for physical uplink control channel (PUCCH) and physical uplink shared channel (PUSCH) transmissions (or shortened PUCCH (sPUCCH) and shortened PUSCH (sPUSCH) transmissions). Thus, within first slot 225 or second slot 230, there may be multiple sTTIs, such as a first sTTI (TTI-0) 235, a second sTTI (TTI-1) 240, and a third sTTI (TTI-2) 245, that may each have a two or three OFDM symbol duration. Such TTI durations may also apply to downlink subframes 218 transmitted on downlink carrier 215.

When two-symbol sTTIs are used, in some cases it may be desirable to have a fixed sTTI structure in which sTTI boundaries lie within slot boundaries or are aligned with slot boundaries, such as the boundaries of the first slot 225 or second slot 230, which may be referred to as slot-aligned sTTIs. As discussed above, when using a normal CP, seven symbols are included in each slot 225-230, and thus each slot may include three sTTIs for slot-aligned sTTIs. In some cases, one of the sTTIs may be configured as a three-symbol TTI, so as to efficiently utilize each symbol of each slot. In such cases, different patterns can be considered, such as having the three-symbol TTI located at the end of a slot 225-230, or at the beginning of a slot 225-230. When using two-symbol sTTIs or a combination of two-symbol and three-symbol sTTIs, such sTTIs may be referred to as 2-symbol sTTIs. When using sTTIs having a duration corresponding to one slot, such sTTIs may be referred to as slot sTTIs or slot-aligned sTTIs. When using TTIs having a duration correspond to a subframe, such TTIs may be referred to as 1 ms TTIs or legacy TTIs.

In some examples, 2-symbol downlink sTTIs may use a first pattern of symbols {3, 2, 2, 2, 2, 3} for the two slots within a subframe boundary, or may use a second pattern of symbols {2, 3, 2, 2, 2, 3} for such transmissions. In some cases, the pattern to be used may be indicated in a legacy control channel such as a physical control format indicator channel (PCFICH), in which the legacy control region of 1 or 3 symbols indicates the first pattern, and a legacy control region of 2 symbols indicates the second pattern. One of the following two patterns will also be specified for the uplink transmissions for 2-symbol sTTI transmissions: {3,2, 2, 2, 2, 3} or {2, 2, 3,2, 2, 3}).

As indicated above, in some cases power parameters for uplink and downlink resources may be managed to provide different sets of resources that use different power parameters. Such different power parameters may allow for enhanced interference management which may help to enhance the reliability of certain transmissions, such as low latency transmissions that may have relatively strict reliability targets. In some cases, resources may be managed for low latency transmissions in the form of puncturing non-low latency transmissions (e.g., legacy 1-ms traffic, legacy ultra-low latency traffic with lower reliability targets, etc.), reservation of resources for high reliability and low-latency operation (e.g., through reserved frequency and/or time domain resources), superposition with other traffic (e.g., legacy 1-ms traffic), or combinations thereof.

In some examples, the first base station 105-a and the second base station 105-b may coordinate subband-dependent power management for DL and/or UL, potentially combined with a subset of sTTI or a subset of symbols. In some cases, downlink or uplink transmissions may have an available bandwidth (e.g., 20 MHz) for transmissions, which may be partitioned into a number of sub-bands (e.g., 5 MHz sub-bands). In such cases, different sub-bands may be configured with different power parameters. For example a 20 MHz-bandwidth may be partitioned into four sub-bands, each of 5 MHz, providing SB1, SB2, SB3, and SB4. In this example, SB1 and SB2 may be managed with regular power, SB3 may be managed with reduced power (e.g., 10 dB lower compared with SB1 and SB2), and SB4 may be is reserved (no transmissions). One or more cell-specific reference signal (CRS) transmissions may be transmitted with regular power across all sub-bands. The sub-bands and power parameters may be indicated through UE-specific or cell-specific signaling, in some examples. In some examples, a traffic-to-pilot ratio (TPR) may be determined based on a type of pilot or reference signal that is transmitted and the power parameters associated with a resource. For example, for CRS-based downlink transmissions, a UE 115 can be indicated or determine the TPR (i.e., a physical data shared channel (PDSCH)-to-CRS ratio) based on the restricted power management in different sub-bands. For demodulation reference signal (DM-RS) based downlink transmissions, the UE 115 can assume the same TPR (i.e., PDSCH-to-DM-RS ratio) across all subbands, although the absolute power for each sub-band can be different. In other words, both DM-RS and PDSCH have the same amount of restriction in power management for a given subband In some examples, power restrictions for certain resources through power parameters associated with the resources may be used for time resources, in addition to or alternatively to frequency resources. For example, a set of resources may be identified to include only certain sTTIs or OFDM symbol(s). In other cases, both time and frequency resources may be identified for different sets of resources. For example, SB1 may have a first set of power parameters for a first sTTI and a second set of power parameters for a second sTTI. In some cases, power restrictions associated with a set of power parameters may be specified through specifying a reduced maximum transmit power per sub-band, a power offset compared with non-restricted subbands, or a separate set of open (or closed) loop power control parameters (vs. the parameters used for subbands without restriction). In some examples, if a reduced maximum transmit power is used, a transmission may be transmitted using only resources that have the same power parameters, for efficient reception purposes. For example, it may not be desirable to have a PUSCH transmission with some RBs in a first subband with a first power restriction, and other RBs in a second subband with a second power restriction. In other examples, if a power offset between different sets of power parameters is used, a single uplink channel transmission may have some RBs in a first sub-band with a first restriction, and other RBs in a second sub-band with a second restriction. Similarly, if different sets of resources include time resources, power restrictions for one or more sets of resources may be applied only in certain sTTIs or symbol(s), instead of all sTTIs/symbols of a sub-band in a subframe. In further examples, both time and frequency resources may be identified for different sets of resources, resulting in sTTI-dependent sub-band power restrictions, such as discussed above (e.g., SB1 in a first sTTI has a first power level, but in a second sTTI has a second power level that is different from the first power level).

In some cases, the first base station 105-a may use beamforming to transmit a beam 250 in a desired direction, and the second base station 105-b may use beamforming to transmit a second beam 255 in a desired direction. In some cases, the first base station 105-a and the second base station 105-b may coordinate one or more of the second set of power parameters to coordinate beam directions of the first base station 105-a and second base station 105-b to be different beam directions.

In some examples, the first base station 105-a and the second base station 105-b may coordinate different power parameters for different sets of resources through backhaul coordination. Such backhaul coordination may include frequency domain resource reservations for low latency transmissions, such as by using a block of RBs as the granularity for the reservations. Additionally or alternatively, such backhaul coordination may include time domain resource reservation, such as by using 1-symbol or 2-symbol sTTI as the unit for reservations. In some cases, power parameters may be applied to sets of resources for both uplink and downlink resources, and can be a pair combination of downlink and uplink resources in each link direction, which may help ensure reduced likelihood of inter-cell interference for transmissions over resources with power restricted power parameters. In some cases, interference coordination can also be in the form of reduced downlink transmit power and/or reduced uplink transmit power in some RBs and/or some sTTIs or symbols. In some cases, a power spectral density (PSD) may be identified across different sets of resources, and the power parameters for the first set of resources and the second set of resources may be selected to achieve the identified PSD (e.g., power for some frequency resources may be reduced relative to other frequency resources to achieve a desired spectral density of power). In some further examples, the UEs 115 may each provide periodic channel state information (CSI) reports, and a base station 105 may receive CSI reports and identify that certain resources are experiencing increased interference or interference that exceeds a threshold level. In such cases, a base station 105 may add the identified resources to the set of resources with the power parameters that provide reduced transmission powers in order to reduce potential interference at a neighboring base station 105. In some cases, the base stations 105 may coordinate with each other to add such resources to the set of resources with reduced power levels.

Figure 3:
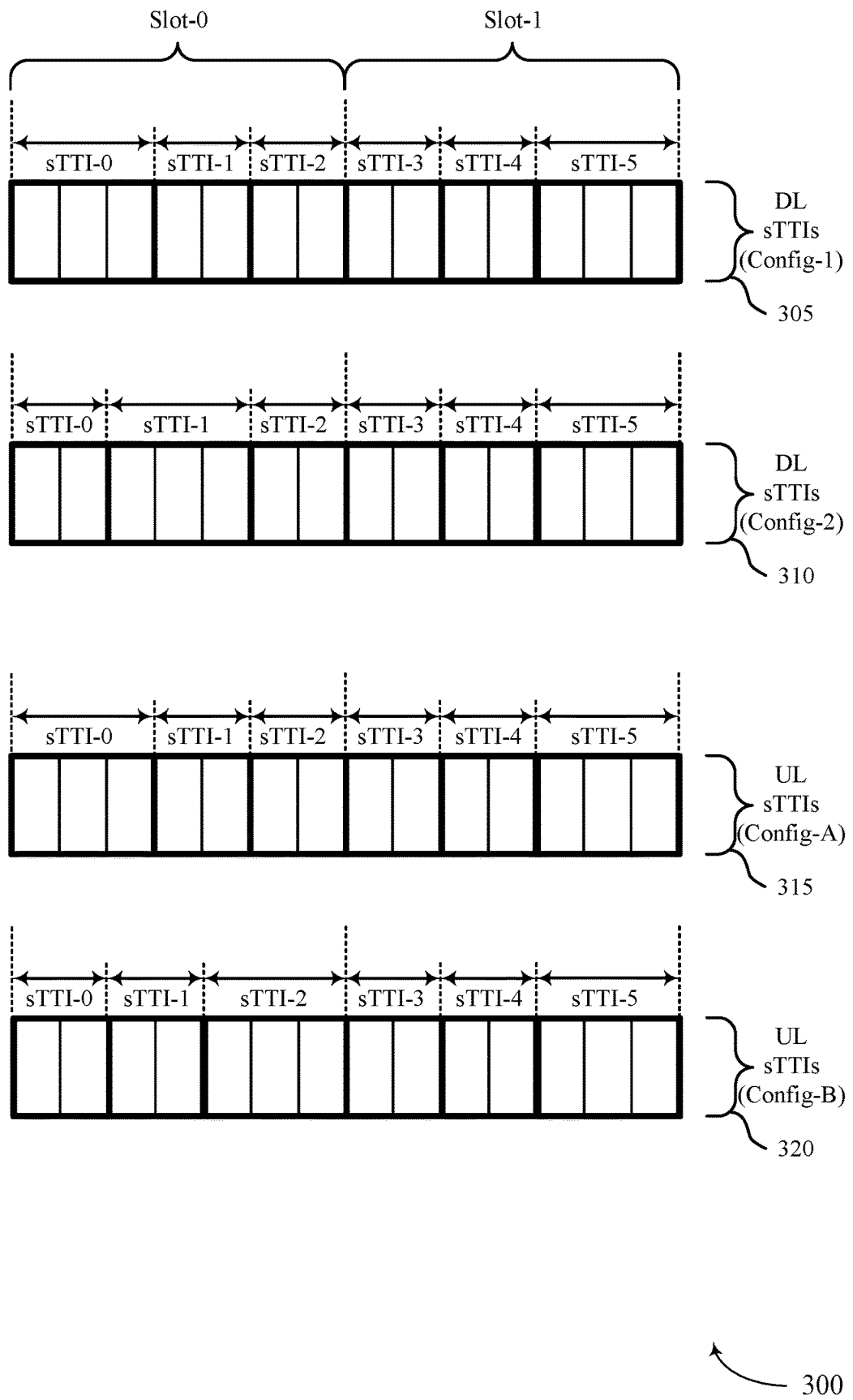
FIG. 3 illustrates an example of shortened transmission time interval (sTTI) structures that support resource management for low latency wireless communications in accordance with aspects of the present disclosure.

FIG. 3 illustrates an example of sTTI structures 300 that support resource management for low latency wireless communications in accordance with aspects of the present disclosure. The sTTI structures 300 may be used for communications between a UE and a base station such as discussed with respect to FIGS. 1 and 2. Various different configurations of sTTIs may be implemented, in which sTTIs may be arranged to be aligned with subframes or slots.

In this example, two downlink sTTI configurations and two uplink sTTI configurations may be available for low latency downlink transmissions, although the techniques described herein apply to other sTTI configurations that may be implemented. A first downlink sTTI configuration is illustrated in downlink sTTIs 305, which may be used for downlink transmissions from a base station to a UE, and be transmitted using the pattern {3,2, 2, 2, 2, 3} as discussed above. In this example, for downlink sTTIs 305, sTTI-0 may be a three-symbol sTTI, sTTI-1 through sTTI-4 may be two-symbol sTTIs, and sTTI-5 may be a three-symbol sTTI in accordance with a first downlink sTTI configuration. A second downlink sTTI configuration is illustrated in downlink sTTIs 310, which may have the pattern {2, 3,2, 2, 2, 3} as discussed above. In this example, for downlink sTTIs 310 having the second downlink configuration, sTTI-0 may be a two-symbol sTTI, sTTI-1 may be a three-symbol sTTI, sTTI-2 through sTTI-4 may be two-symbol sTTIs, and sTTI-5 may be a three-symbol sTTI.

Also in this example, different configurations for uplink sTTIs are illustrated. In this example, uplink sTTIs 315 with a first configuration (configuration-A) may be used for uplink transmissions from the UE to the base station. In this example, uplink sTTIs 315 may have the pattern {3,2, 2, 2, 2, 3} as discussed above. In this example, for uplink sTTIs 315 having the uplink configuration-A, sTTI-0 may be a three-symbol sTTI, sTTI-1 through sTTI-4 may be two-symbol sTTIs, and sTTI-5 may be a three-symbol sTTI. A second configuration of uplink sTTIs 320 (configuration-B) in this example, may have the pattern {2, 2, 3,2, 2, 3} as discussed above. In this example, for uplink sTTIs 320 having the uplink configuration-B, sTTI-0 and sTTI-1 may be a two-symbol sTTIs, sTTI-2 may be a three-symbol sTTI, sTTI-3 and sTTI-4 may be a two-symbol sTTIs, sTTI-5 may be a three-symbol sTTI.

As discussed above, low latency transmissions that use sTTI structures such as illustrated in FIG. 3 may have relatively high reliability targets. In some examples, transmission powers for certain wireless transmission resources may be restricted in order to help reduce interference between different cells, and such wireless transmission resources may be selected for transmission of low latency communications. While the use of power-restricted resources may help reduce interference for low latency transmissions, other non-power restricted resources may also be used for such low latency transmissions, and a base station may allocate resources from any set of resources, power-restricted or not, based on various factors, such as current traffic conditions, current interference levels for different resources (e.g., derived from CSI reports), availability of different resources, etc.

Figure 4:
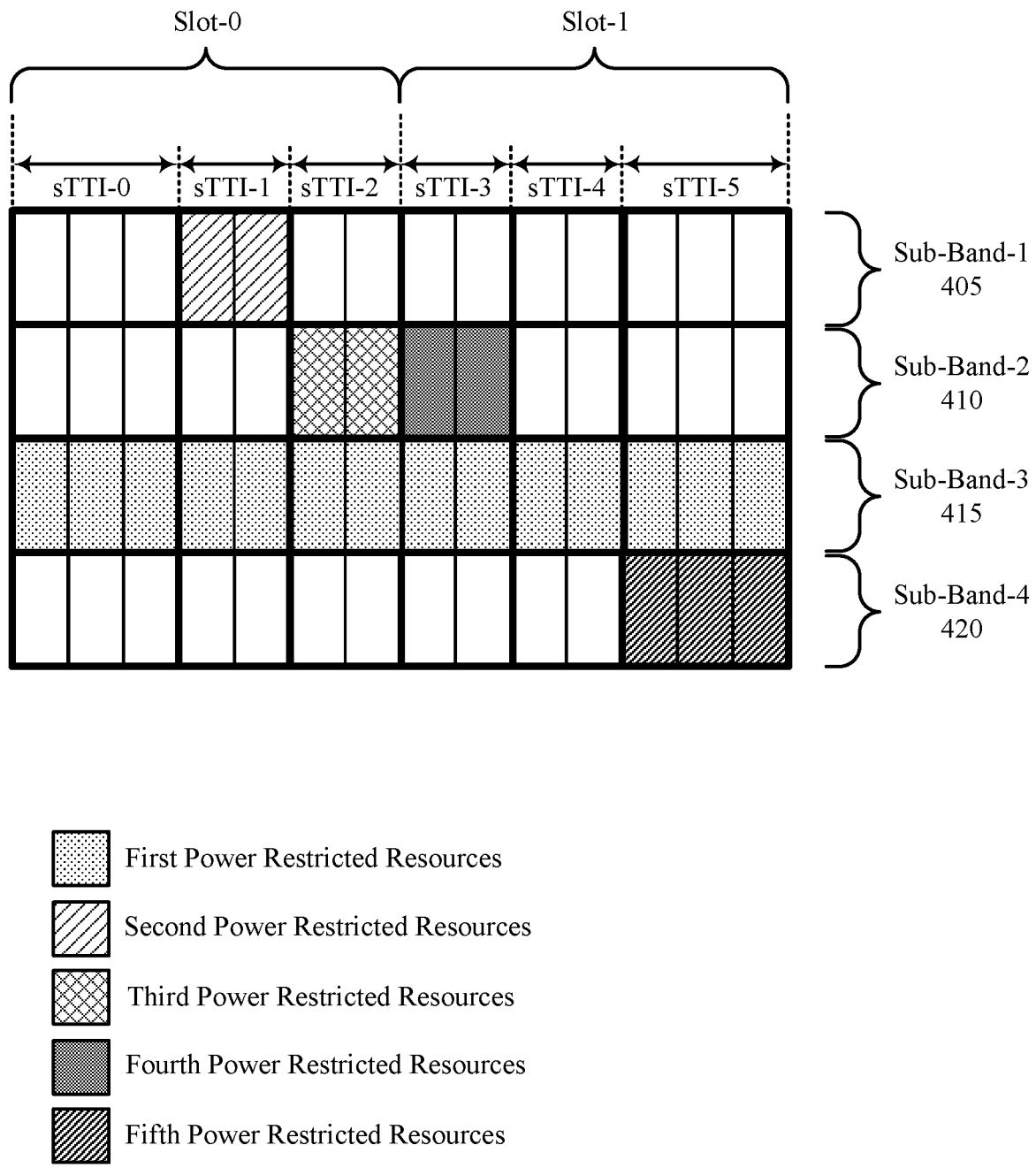
FIG. 4 illustrates an example of sets of wireless resources that supports resource management for low latency wireless communications in accordance with aspects of the present disclosure.

FIG. 4 illustrates an example of sets of wireless resources 400 that supports resource management for low latency wireless communications in accordance with aspects of the present disclosure. Wireless resources 400 may be used for communications between a UE and a base station such as discussed with respect to FIGS. 1 and 2.

In this example, wireless resources 400 may include a subframe that may be configured with sTTIs according to the pattern {3, 2, 2, 2, 2, 3}, although this example is provided for discussion purposes and techniques as discussed herein may be applied to any sTTI pattern, or to wireless resources that are not configured according to a sTTI pattern. The subframe may have frequency resources that span four sub-bands, namely sub-band-1 405, sub-band-2 410, sub-band-3 415, and sub-band-4 420. The wireless resources 400 may include sets of resources that may have different associated power parameters. In this example, different time and frequency resources may have different power parameters, although resources with different power parameters may include only different time resource or only different frequency resources, as discussed above. In this examples, all of the time resources of sub-band-3 415 may be a first subset of power restricted resources, sTTI-1 of sub-band-1 405 may be a second subset of power restricted resources, sTTI-2 of sub-band-2 410 may be a third subset of power restricted resources, sTTI-3 of sub-band-2 410 may be a fourth subset of power restricted resources, and sTTI-5 of sub-band-4 may be a fifth subset of power restricted resources. In some cases, the first-fifth subsets of power restricted resources may be collectively grouped as a set of power restricted resources. In other cases, one or more of the first-fifth subsets of power restricted resources may be grouped into different sets of power restricted resources, which may have differing amount of power restrictions applied (including a no-power restriction that may reserve certain resources). Wireless resources outside of the first-fifth subsets of power restricted resources may not have any power restrictions applied, and may be include transmissions with power levels determined according to unrestricted power parameters, while the power restricted resources may have an offset or a specified reduced power from the unrestricted power parameters, such as discussed above.

Figure 5:
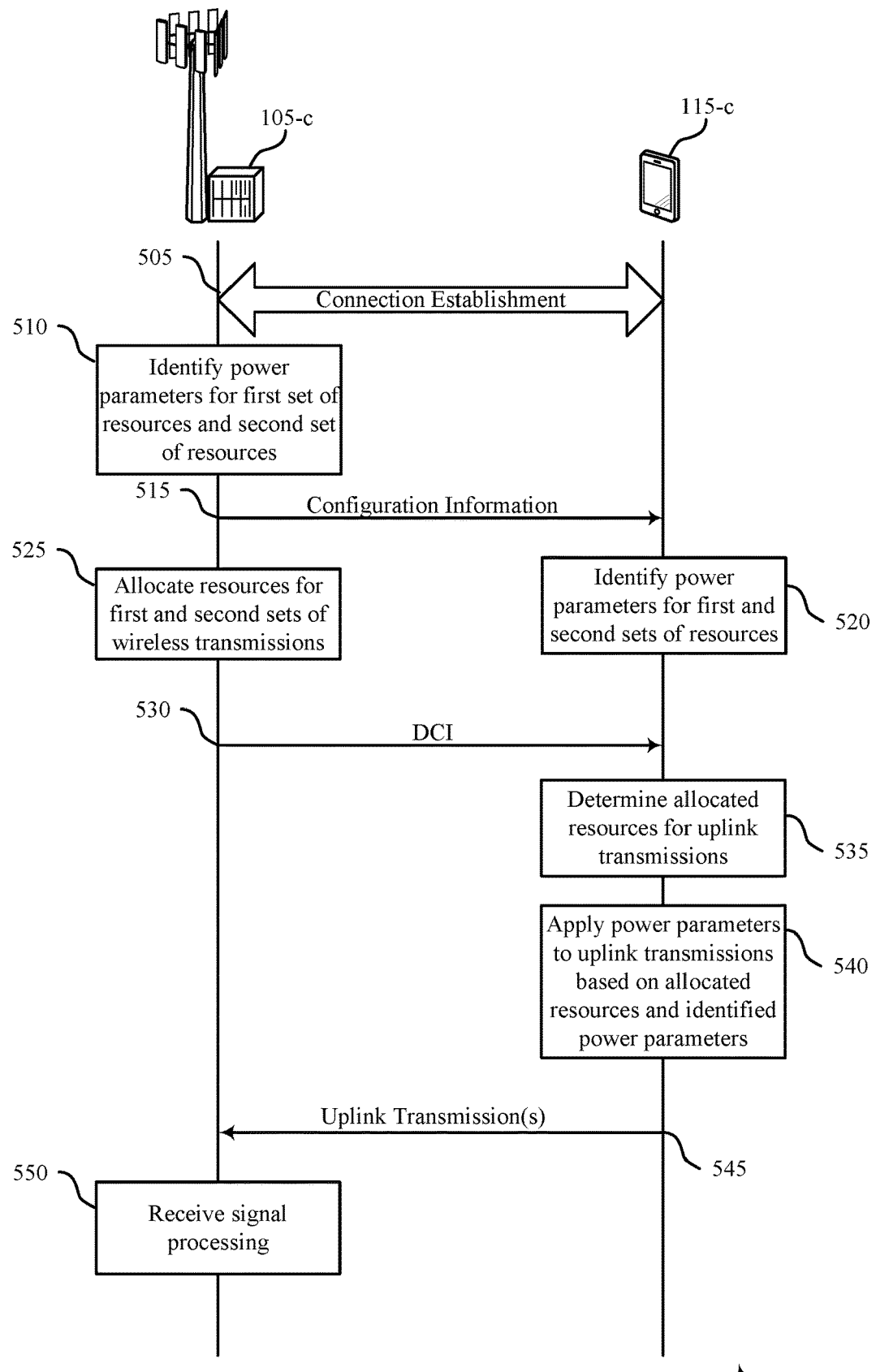
FIG. 5 illustrates an example of a process flow that supports resource management for low latency wireless communications in accordance with aspects of the present disclosure.

FIG. 5 illustrates an example of a process flow 500 that supports resource management for low latency wireless communications in accordance with aspects of the present disclosure. Process flow 500 may include a base station 105-c, and a UE 115-c, which may be examples of the corresponding devices as described with reference to FIG. 1-2. The base station 105-c and the UE 115-c may establish a connection 505 according to connection establishment techniques for the wireless communications system.

At block 510, base station 105-c may identify power parameters for first set of resources and second set of resources. Such power parameters may be identified based on a services that may be provided by the base station 105-c, such as URLLC services or eMBB services. In some cases, the base station 105-c may identify a first set of unrestricted power parameters for non-low-latency or non-high-reliability transmissions for the first set of resources, and may identify a second set of restricted power parameters for low-latency and high-reliability transmissions for the second set of resources. In some cases, the second set of restricted power parameters may reduce power for the second set of resources in order to mitigate potential interference with one or more other base stations. The base station 105-c transmits configuration information 515 to the UE 115-c, which may indicate the power parameters.

At block 520, The UE 115-c may identify the power parameters for the first and second sets of resources. In some cases, the UE 115-c may identify the first set of power parameters, and apply a reduced power or power offset to determine the second set of power parameters. In some cases, the configuration information 515 may indicate each of the first set and second set of power parameters.

At block 525, the base station 105-c may allocate resources for first and second sets of wireless transmissions. Such a resource allocation may include allocating resources in the first set of resources for non-low-latency transmissions, and allocating resources in the second set of resources for low-latency transmissions. In some cases, resources within the second set of resources may be allocated for non-low-latency transmissions, which may be transmitted with the restricted power parameters of the second set of power parameters. The resource allocation(s) may be transmitted to the UE 115-c in downlink control information (DCI) 530.

At block 535, the UE 115-c may receive the DCI 530 and determine the allocated resources for uplink transmissions. Depending upon the set of resources that contain the allocated resources, the UE 115-c may apply the corresponding set of power parameters, as indicated at block 540, and may transmit the uplink transmission(s) 545. At block 550, the base station 105-c may perform received signal processing (e.g., HARQ processing, etc.).

Figure 6:
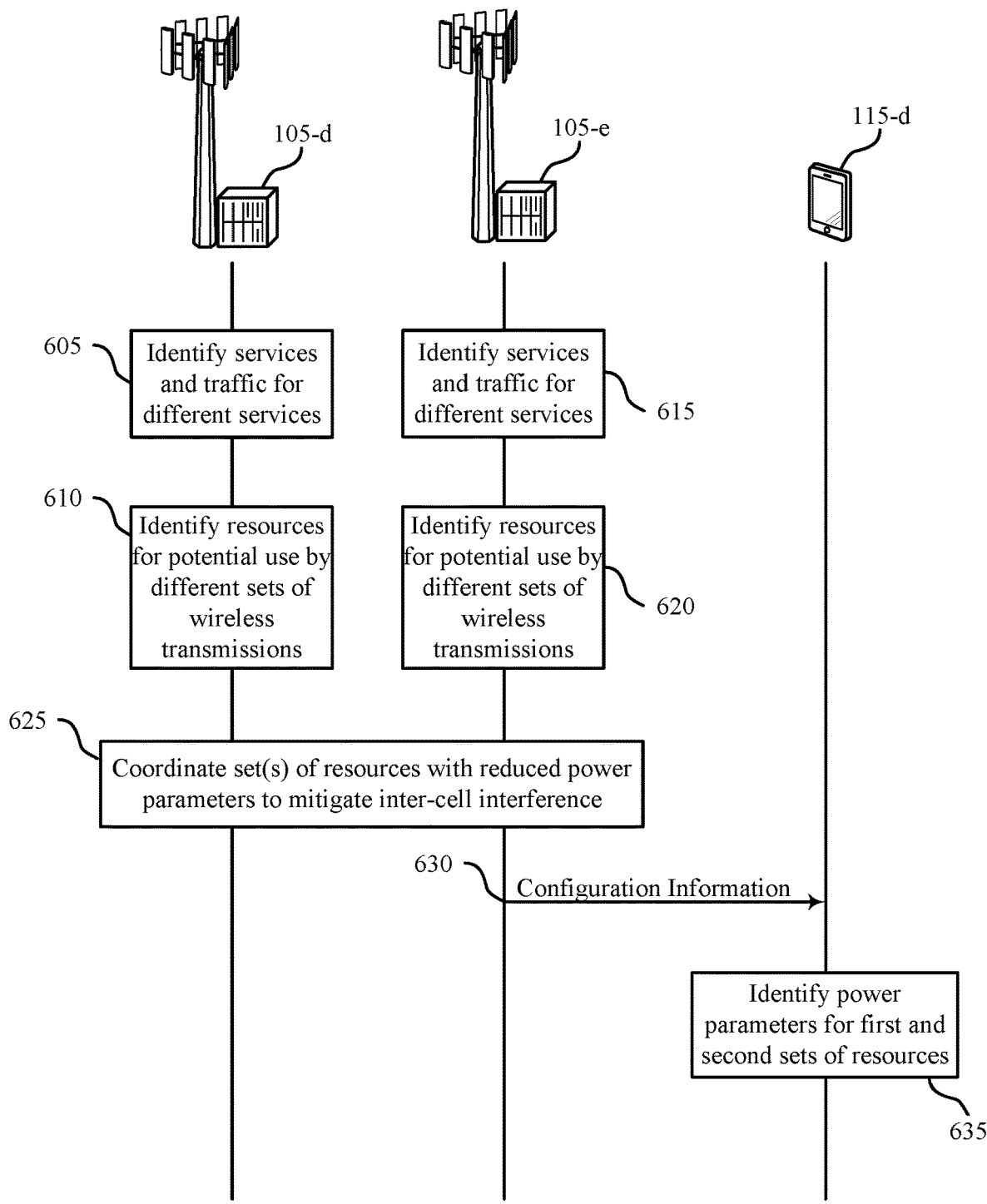
FIG. 6 illustrates an example of a process flow that supports resource management for low latency wireless communications in accordance with aspects of the present disclosure.

FIG. 6 illustrates an example of a process flow 600 that supports resource management for low latency wireless communications in accordance with aspects of the present disclosure. Process flow 600 may include a first base station 105-d, a second base station 105-e, and a UE 115-d, which may be examples of the corresponding devices as described with reference to FIGS. 1-2.

At block 605, the first base station 105-d may identify services and traffic for different services. The services may be identified based on data to be transmitted to one or more served UEs, established services for one or more UEs, or one or more requests for a service from one or more UEs. Services may include, for example, one or more low-latency services, one or more non-low latency services, or combinations thereof. At block 615, the second base station 105-e may also identify services and traffic for different services in a similar manner.

At block 610, the first base station 105-d may identify resources for potential use by different sets of wireless transmissions. In some cases, the first base station may identify a first set of resources and a second set of resources, that may be identified as resource sets that may have different power parameters applied to wireless transmissions that use the resources. In some cases, it may be preferred that transmissions of certain wireless services, such as low latency and high-reliability services (e.g., URLLC services) that use a second set of resources that may have power restricted power parameters and 1 ms TTI services (e.g., eMBB services) that may use a first set of resources that may not have power restricted power parameters, for example. At block 615, the second base station 105-e may identify resources for potential use by different sets of wireless transmissions in a similar manner.

At block 625, the first base station 105-d and the second base station 105-e may coordinate set(s) of resources with reduced power parameters to mitigate inter-cell interference. Such coordination may be through identifying the different sets of resources and identifying power parameters for each of the sets. In some examples, such coordination may be through backhaul coordination over a backhaul link (e.g., an X2 link).

The second base station 105-e may, in this example provide configuration information 630 to UE 115-d. The configuration information 630 may include, for example, an indication of the different sets of resources and an indication of power parameters for at least one of the sets of resources. In some cases, the configuration information 630 may include power parameters for each set of resources.

At block 635, the UE 115-d may identify power parameters for first and second sets of resources. The UE 115-d may identify the power parameters based on an indication of a first set of power parameters and applying a power difference or offset to the first set of power parameters to obtain a second set of power parameters. In some cases, the UE 115-d may identify the power parameters for the first and second sets of resources based on signaling that indicates the power parameters.

Such power parameters may be identified based on a services that may be provided by the second base station 105-e, such as URLLC services or eMBB services. In some cases, the second base station 105-e may identify a first set of unrestricted power parameters for non-low-latency or non-high-reliability transmissions for the first set of resources, and may identify a second set of restricted power parameters for low-latency and high-reliability transmissions for the second set of resources. In some cases, the second set of restricted power parameters may reduce power for the second set of resources in order to mitigate potential interference with one or more other base stations. Following the identification of power parameters, the second base station 105-e and the UE 115-d may perform similar operations as described with reference to FIG. 5.

Figure 7:
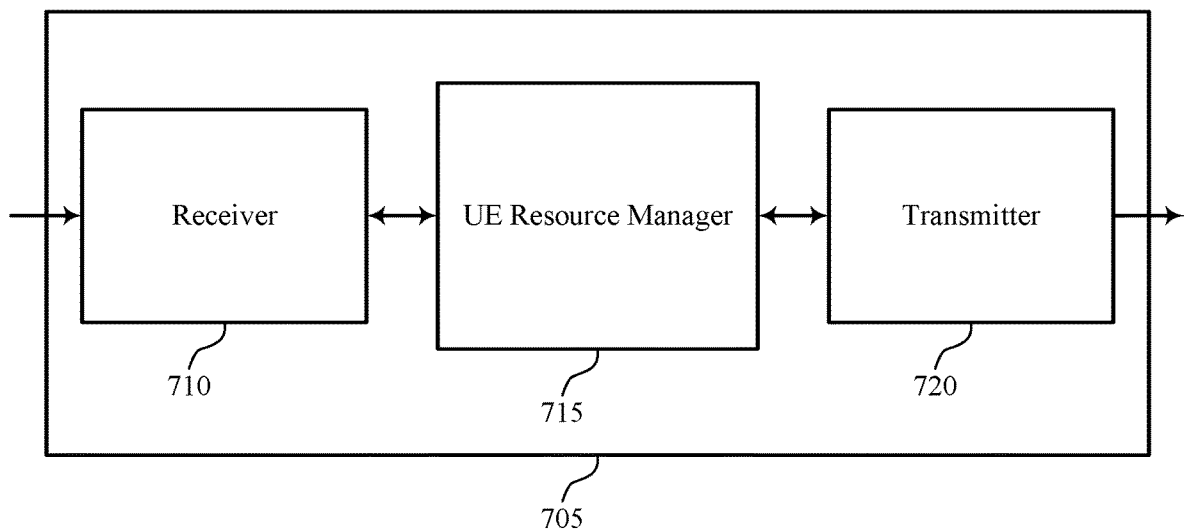
FIGS. 7 through 8 show block diagrams of wireless devices that support resource management for low latency wireless communications in accordance with aspects of the present disclosure.

FIG. 7 shows a block diagram 700 of a wireless device 705 that supports resource management for low latency wireless communications in accordance with aspects of the present disclosure. Wireless device 705 may be an example of aspects of a UE 115 as described with reference to FIG. 1. Wireless device 705 may include receiver 710, UE resource manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to resource management for low latency wireless communications, etc.). Information may be passed on to other components of the device. The receiver 710 may be an example of aspects of the transceiver 1035 as described with reference to FIG. 10.

UE resource manager 715 may be an example of aspects of the UE resource manager 1015 as described with reference to FIG. 10.

UE resource manager 715 and/or at least some of its various sub-components may be implemented in hardware, software executed by a processor, firmware, or any combination thereof. If implemented in software executed by a processor, the functions of the UE resource manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE resource manager 715 and/or at least some of its various sub-components may be physically located at various positions, including being distributed such that portions of functions are implemented at different physical locations by one or more physical devices. In some examples, UE resource manager 715 and/or at least some of its various sub-components may be a separate and distinct component in accordance with various aspects of the present disclosure. In other examples, UE resource manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE resource manager 715 may identify a first set of power parameters associated with a first set of resources for a first set of wireless transmissions, the first set of wireless transmissions having a first duration TTI and receive signaling indicating a second set of resources for at least a first subset of a second set of wireless transmissions, the second set of wireless transmissions having a second duration TTI that is shorter than the first duration TTI, and the second set of resources associated with a second set of power parameters providing reduced power relative to the first set of power parameters.

Transmitter 720 may transmit signals generated by other components of the device. In some examples, the transmitter 720 may be collocated with a receiver 710 in a transceiver module. For example, the transmitter 720 may be an example of aspects of the transceiver 1035 as described with reference to FIG. 10. The transmitter 720 may include a single antenna, or it may include a set of antennas.

Transmitter 720 may transmit the first set of wireless transmissions using the first set of resources according to the first set of power parameters and transmit the at least the first subset of the second set of wireless transmissions using the second set of resources according to the second set of power parameters.

Figure 8:
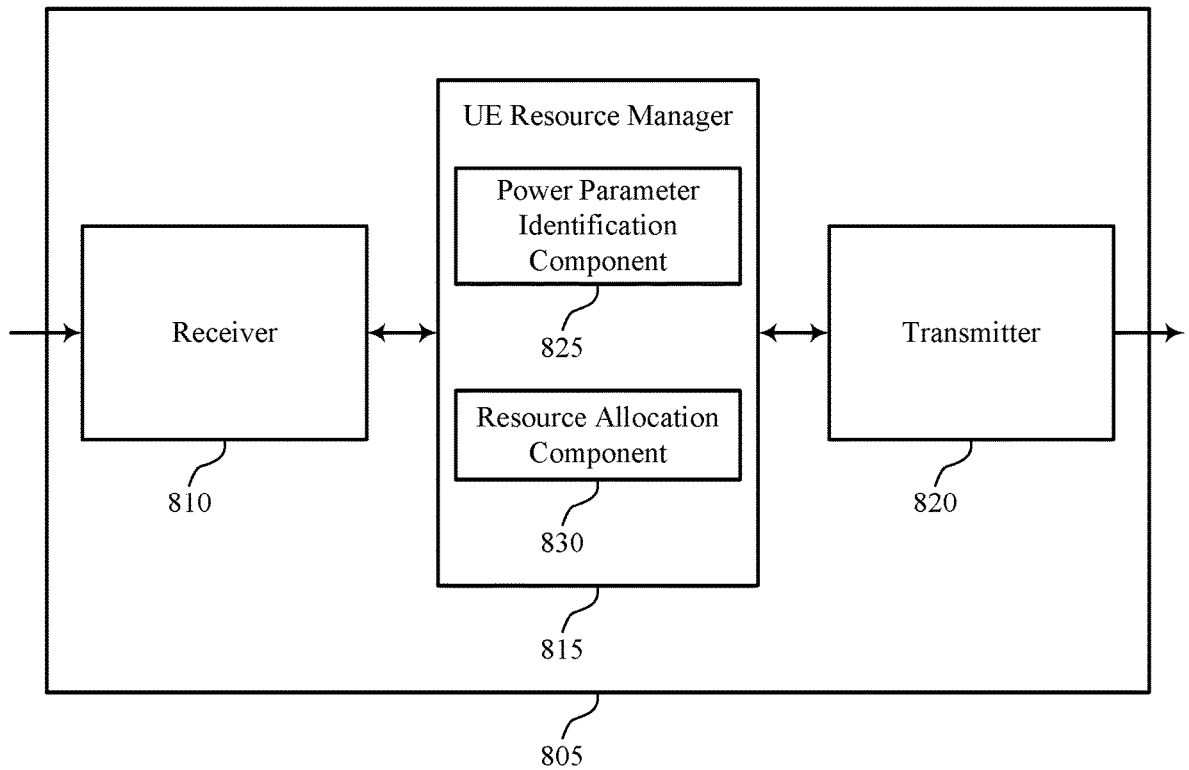

FIG. 8 shows a block diagram 800 of a wireless device 805 that supports resource management for low latency wireless communications in accordance with aspects of the present disclosure. Wireless device 805 may be an example of aspects of a wireless device 705 or a UE 115 as described with reference to FIGS. 1 and 7. Wireless device 805 may include receiver 810, UE resource manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to resource management for low latency wireless communications, etc.). Information may be passed on to other components of the device. The receiver 810 may be an example of aspects of the transceiver 1035 as described with reference to FIG. 10.

UE resource manager 815 may be an example of aspects of the UE resource manager 1015 as described with reference to FIG. 10. UE resource manager 815 may also include power parameter identification component 825 and resource allocation component 830.

Power parameter identification component 825 may identify a first set of power parameters associated with a first set of resources for a first set of wireless transmissions, the first set of wireless transmissions having a first duration TTI. In some cases, signaling may be received indicating the second set of power parameters. In some cases, the power parameter identification component 825 may identify a third set of power parameters associated with the second subset of time resources. In some cases, the identifying the second set of power parameters includes one or more of identifying a maximum transmit power of the first set of power parameters and applying a reduction to the maximum transmit power for the second set of power parameters, identifying a first transmit power of the first set of power parameters and applying an offset to the first transmit power to provide a reduced second transmit power of the second set of power parameters, identifying a first set of open or closed loop power control parameters for the first set of resources, identifying a second set of open or closed loop power control parameters for the second set of resources, and applying the second set of open or closed loop power control parameters to the second set of resources, or, identifying a maximum PSD for the first set of resources and the second set of resources and selecting a first transmit power for the first set of resources and a second transmit power for the second set of resources to provide a PSD within the maximum PSD. In some cases, the signaling includes cell-specific or UE-specific signaling indicating the second set of power parameters.

Resource allocation component 830 may receive signaling indicating a second set of resources for at least a first subset of a second set of wireless transmissions, the second set of wireless transmissions having a second duration TTI that is shorter than the first duration TTI, and the second set of resources associated with a second set of power parameters providing reduced power relative to the first set of power parameters. In some cases, resource allocation component 830 may coordinate transmission, in a same subframe as the second set of resources, a second subset of the second set of wireless transmissions according to the first set of power parameters, and receive an allocation of resources that span at least a first portion of the first set of resources and a second portion of the second set of resources. In some cases, resource allocation component 830 may transmit the first set of wireless transmissions using the first set of resources and the second set of resources, identify that data associated with the second set of wireless transmissions is to be transmitted, and puncture the first set of wireless transmissions with a second transmission of the second set of wireless transmissions. In some cases, the first set of wireless transmissions includes a first uplink transmission from a UE to a base station, and where the first set of resources is selected to provide that the first uplink transmission is transmitted exclusively using the first set of power parameters. In some cases, the first set of wireless transmissions includes a first uplink transmission from a UE to a base station, and where wireless resources for the first uplink transmission are selected from both the first set of resources and the second set of resources, and where an offset is applied to a first transmit power of the first set of resources to determine a second transmit power of the second set of resources.

Transmitter 820 may transmit signals generated by other components of the device. In some examples, the transmitter 820 may be collocated with a receiver 810 in a transceiver module. For example, the transmitter 820 may be an example of aspects of the transceiver 1035 as described with reference to FIG. 10. The transmitter 820 may include a single antenna, or it may include a set of antennas.

Figure 9:
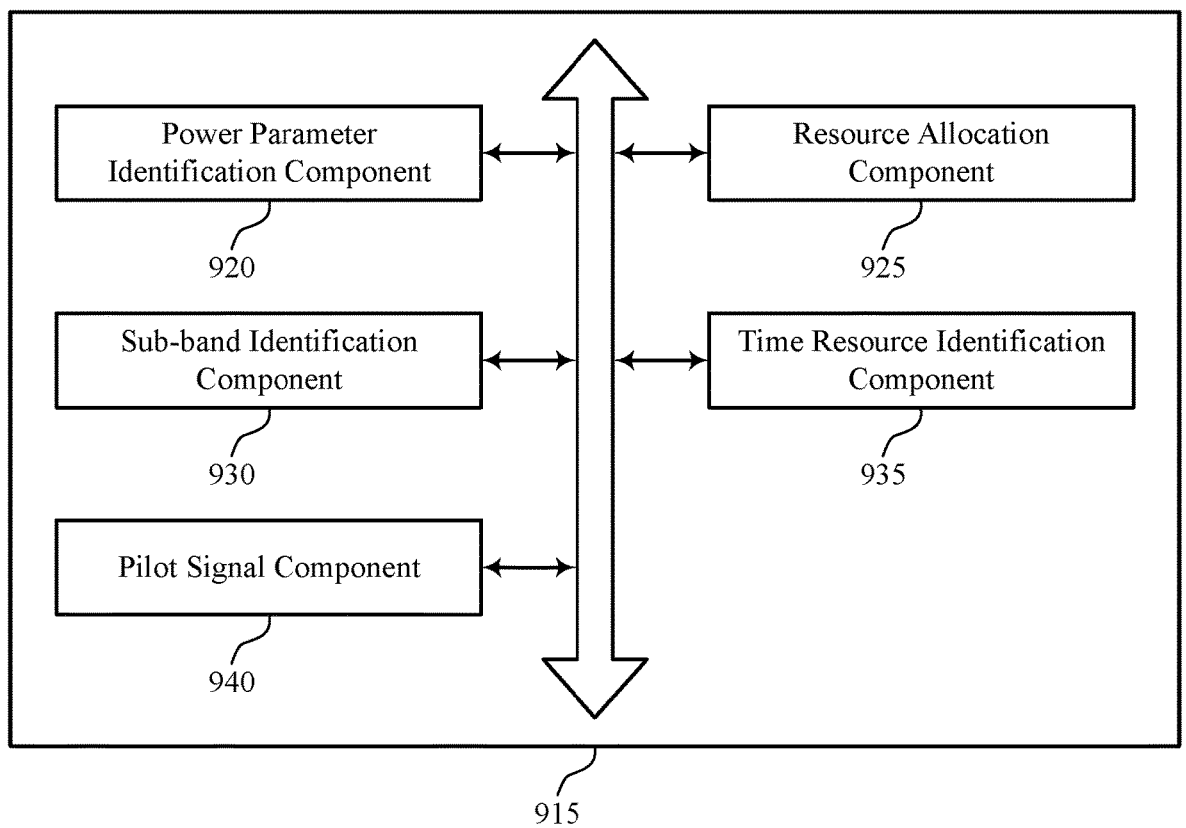
FIG. 9 shows a block diagram of a user equipment (UE) resource manager that supports resource management for low latency wireless communications in accordance with aspects of the present disclosure

FIG. 9 shows a block diagram 900 of a UE resource manager 915 that supports resource management for low latency wireless communications in accordance with aspects of the present disclosure. The UE resource manager 915 may be an example of aspects of a UE resource manager 715, a UE resource manager 815, or a UE resource manager 1015 as described with reference to FIGS. 7, 8, and 10. The UE resource manager 915 may include power parameter identification component 920, resource allocation component 925, sub-band identification component 930, time resource identification component 935, and pilot signal component 940. Each of these modules may communicate, directly or indirectly, with one another (e.g., via one or more buses).

Power parameter identification component 920 may identify a first set of power parameters associated with a first set of resources for a first set of wireless transmissions, the first set of wireless transmissions having a first duration TTI. In some cases, signaling may be received indicating the second set of power parameters. In some cases, the power parameter identification component 920 may identify a third set of power parameters associated with the second subset of time resources. In some cases, the identifying the second set of power parameters includes one or more of identifying a maximum transmit power of the first set of power parameters and applying a reduction to the maximum transmit power for the second set of power parameters, identifying a first transmit power of the first set of power parameters and applying an offset to the first transmit power to provide a reduced second transmit power of the second set of power parameters, identifying a first set of open or closed loop power control parameters for the first set of resources, identifying a second set of open or closed loop power control parameters for the second set of resources, and applying the second set of open or closed loop power control parameters to the second set of resources, or, identifying a maximum PSD for the first set of resources and the second set of resources and selecting a first transmit power for the first set of resources and a second transmit power for the second set of resources to provide a PSD within the maximum PSD. In some cases, the signaling includes cell-specific or UE-specific signaling indicating the second set of power parameters.

Resource allocation component 925 may receive signaling indicating a second set of resources for at least a first subset of a second set of wireless transmissions, the second set of wireless transmissions having a second duration TTI that is shorter than the first duration TTI, and the second set of resources associated with a second set of power parameters providing reduced power relative to the first set of power parameters. In some cases, resource allocation component 925 may coordinate transmission, in a same subframe as the second set of resources, a second subset of the second set of wireless transmissions according to the first set of power parameters, and receive an allocation of resources that span at least a first portion of the first set of resources and a second portion of the second set of resources. In some cases, resource allocation component 925 may transmit the first set of wireless transmissions using the first set of resources and the second set of resources, identify that data associated with the second set of wireless transmissions is to be transmitted, and puncture the first set of wireless transmissions with a second transmission of the second set of wireless transmissions. In some cases, the first set of wireless transmissions includes a first uplink transmission from a UE to a base station, and where the first set of resources is selected to provide that the first uplink transmission is transmitted exclusively using the first set of power parameters. In some cases, the first set of wireless transmissions includes a first uplink transmission from a UE to a base station, and where wireless resources for the first uplink transmission are selected from both the first set of resources and the second set of resources, and where an offset is applied to a first transmit power of the first set of resources to determine a second transmit power of the second set of resources.

Sub-band identification component 930 may identify sub-bands of resources associated with one or more sets of resources. In some cases, the first set of resources includes frequency resources in a first sub-band of an available transmission bandwidth for transmitting the first set of wireless transmissions. In some cases, the second set of resources includes frequency resources in a second sub-band of the available transmission bandwidth for transmitting the first set of wireless transmissions or for transmitting the at least the first subset of the second set of wireless transmissions, and where the second sub-band is different than the first sub-band. In some cases, the first set of resources includes the first sub-band and a third sub-band of the available transmission bandwidth, and where a third set of reserved resources may be available for transmitting only transmissions of the second set of wireless transmissions, the third set of reserved resources including a fourth sub-band of the available transmission bandwidth.

Time resource identification component 935 may identify time resources associated with one or more sets of resources. In some cases, the second set of resources further includes a first subset of time resources within the second sub-band for transmitting, using the second set of power parameters, the first set of wireless transmissions or the at least the first subset of the second set of wireless transmissions. In some cases, the first subset of time resources include one or more OFDM symbols or one or more TTIs having the second duration TTI. In some cases, the second set of resources further includes a second subset of time resources within the first sub-band for transmitting the first set of wireless transmissions or the at least the first subset of the second set of wireless transmissions.

Pilot signal component 940 may identify cell-specific reference signal (CRS) resources that span at least a portion of the first set of resources and the second set of resources, determine a TPR for the second set of resources based on the first set of power parameters for portions of the second set of resources that overlap the CRS resources and the second set of power parameters for portions of the second set of resources that are non-overlapping with the CRS resources. In some cases, pilot signal component 940 may identify demodulation reference signal (DMRS) resources associated with the first portion of the first set of resources and the second portion of the second set of resources, and determine a TPR for the first set of resources based on the DMRS resources that overlap the first set of resources being transmitted using the first set of power parameters, and determine the TPR for the second set of resources based on the DMRS resources that overlap the second set of resources being transmitted using the second set of power parameters.

Figure 10:
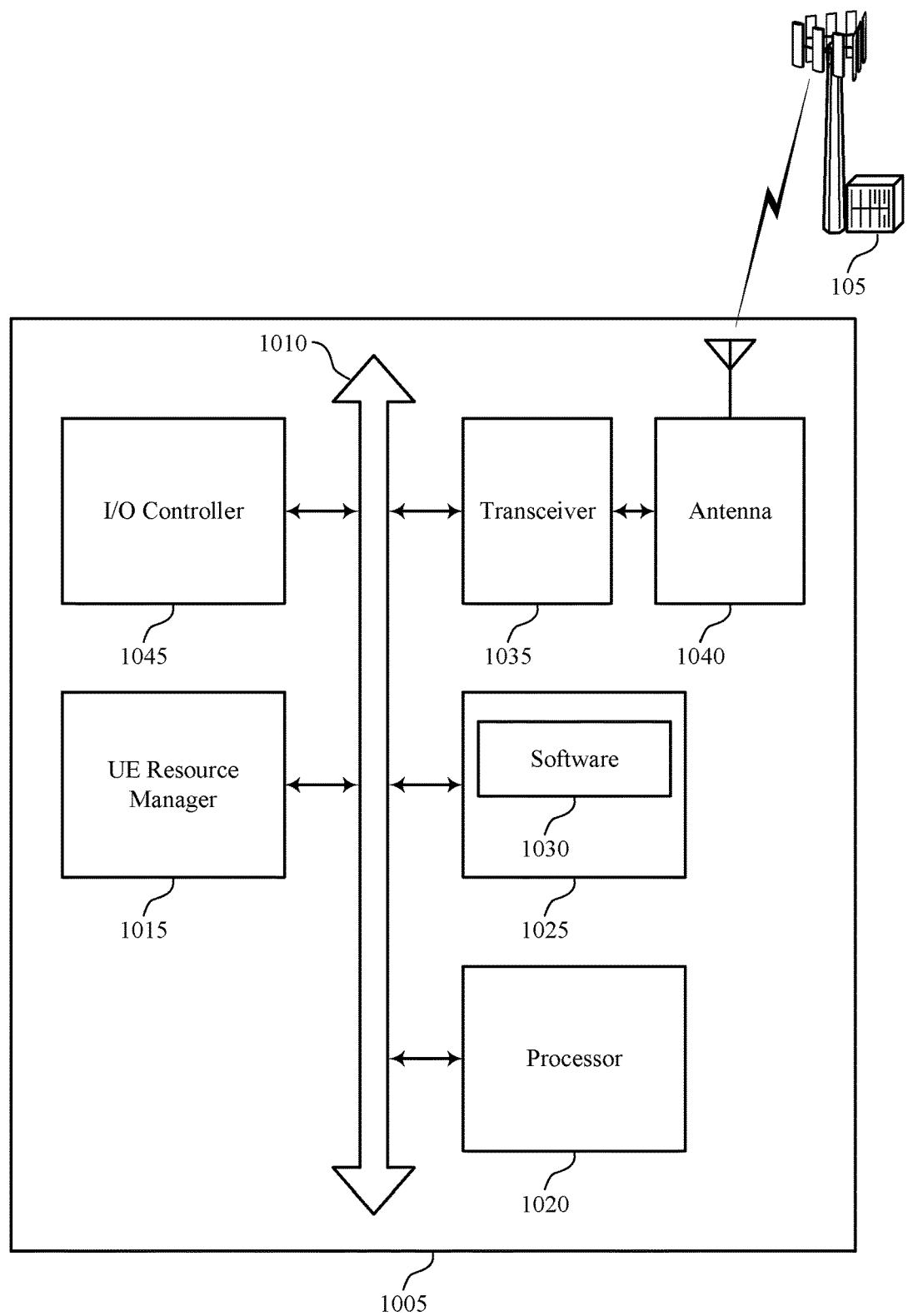
FIG. 10 illustrates a block diagram of a system including a device that supports resource management for low latency wireless communications in accordance with aspects of the present disclosure.

FIG. 10 shows a diagram of a system 1000 including a device 1005 that supports resource management for low latency wireless communications in accordance with aspects of the present disclosure. Device 1005 may be an example of or include the components of wireless device 705, wireless device 805, or a UE 115 as described above with reference to FIGS. 1, 7 and 8. Device 1005 may include components for bi-directional voice and data communications including components for transmitting and receiving communications, including UE resource manager 1015, processor 1020, memory 1025, software 1030, transceiver 1035, antenna 1040, and I/O controller 1045. These components may be in electronic communication via one or more busses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting resource management for low latency wireless communications).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support resource management for low latency wireless communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
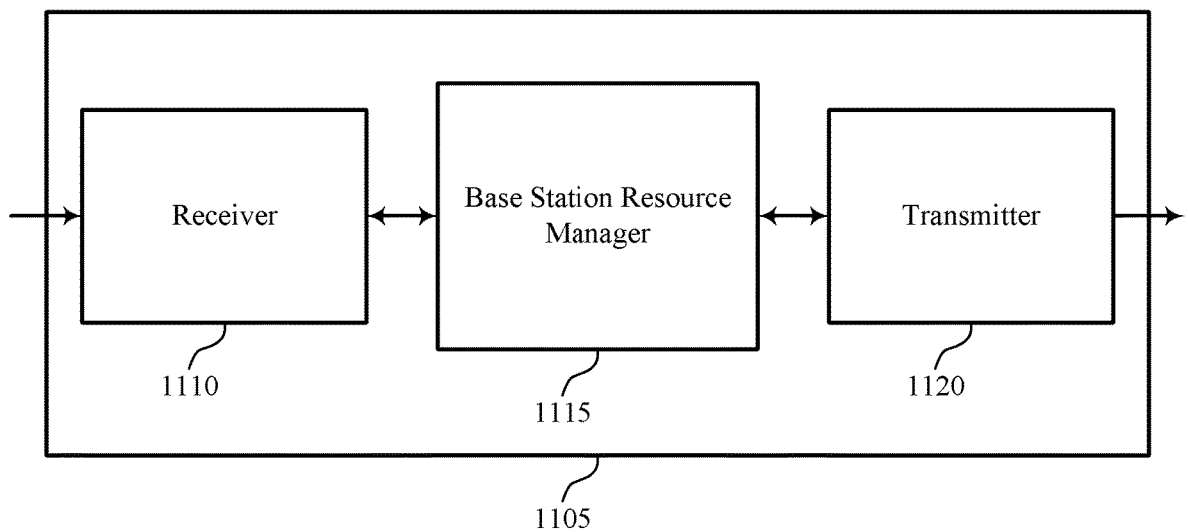
FIGS. 11 through 12 show block diagrams of wireless devices that support resource management for low latency wireless communications in accordance with aspects of the present disclosure.

FIG. 11 shows a block diagram 1100 of a wireless device 1105 that supports resource management for low latency wireless communications in accordance with aspects of the present disclosure. Wireless device 1105 may be an example of aspects of a base station 105 as described with reference to FIG. 1. Wireless device 1105 may include receiver 1110, base station resource manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to resource management for low latency wireless communications, etc.). Information may be passed on to other components of the device. The receiver 1110 may be an example of aspects of the transceiver 1435 as described with reference to FIG. 14.

Base station resource manager 1115 may be an example of aspects of the base station resource manager 1415 as described with reference to FIG. 14.

Base station resource manager 1115 and/or at least some of its various sub-components may be implemented in hardware, software executed by a processor, firmware, or any combination thereof. If implemented in software executed by a processor, the functions of the base station resource manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station resource manager 1115 and/or at least some of its various sub-components may be physically located at various positions, including being distributed such that portions of functions are implemented at different physical locations by one or more physical devices. In some examples, base station resource manager 1115 and/or at least some of its various sub-components may be a separate and distinct component in accordance with various aspects of the present disclosure. In other examples, base station resource manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station resource manager 1115 may identify a first set of power parameters associated with a first set of resources for a first set of wireless transmissions, the first set of wireless transmissions having a first duration TTI, identify a second set of power parameters associated with a second set of resources for a second set of wireless transmissions, the second set of wireless transmissions having a second duration TTI that is shorter than the first duration TTI, and the second set of power parameters providing reduced power relative to the first set of power parameters, and transmit signaling indicating the first set of power parameters and the second set of power parameters to a UE.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 as described with reference to FIG. 14. The transmitter 1120 may include a single antenna, or it may include a set of antennas.

Figure 12:
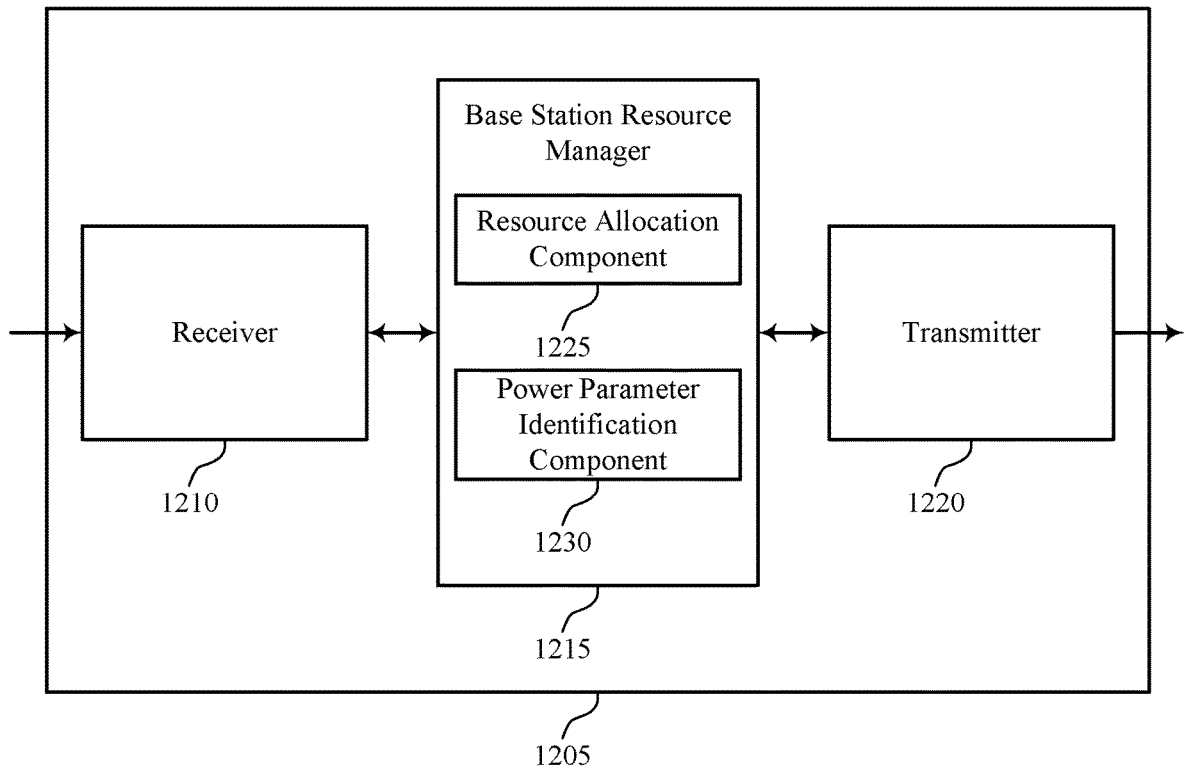

FIG. 12 shows a block diagram 1200 of a wireless device 1205 that supports resource management for low latency wireless communications in accordance with aspects of the present disclosure. Wireless device 1205 may be an example of aspects of a wireless device 1105 or a base station 105 as described with reference to FIGS. 1 and 11. Wireless device 1205 may include receiver 1210, base station resource manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to resource management for low latency wireless communications, etc.). Information may be passed on to other components of the device. The receiver 1210 may be an example of aspects of the transceiver 1435 as described with reference to FIG. 14.

Base station resource manager 1215 may be an example of aspects of the base station resource manager 1415 as described with reference to FIG. 14. Base station resource manager 1215 may also include resource allocation component 1225 and power parameter identification component 1230.

Resource allocation component 1225 may identify a first set of power parameters associated with a first set of resources for a first set of wireless transmissions, the first set of wireless transmissions having a first duration TTI and identify a second set of power parameters associated with a second set of resources for a second set of wireless transmissions, the second set of wireless transmissions having a second duration TTI that is shorter than the first duration TTI, and the second set of power parameters providing reduced power relative to the first set of power parameters. In some cases, the second set of power parameters may provide power that is larger than the first set of power parameters. In some cases, a subset of frequency domain resources are reserved for the second set of wireless transmissions. In some cases, a subset of frequency domain resources include a set of resource blocks. In some cases, the subset of time domain resources are reserved for the second set of wireless transmissions. In some cases, two or more base stations may coordinate the power parameters, and may coordinate uplink and downlink resource pairs for uplink and downlink transmissions of the second set of wireless transmissions between a UE and first base station.

Power parameter identification component 1230 may transmit signaling indicating the first set of power parameters and the second set of power parameters to a UE and apply the second set of power parameters to the third set of resources. In some cases, the coordinating the one or more of the second set of power parameters includes coordinating reduced transmission power for the second set of resources.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 as described with reference to FIG. 14. The transmitter 1220 may include a single antenna, or it may include a set of antennas.

Figure 13:
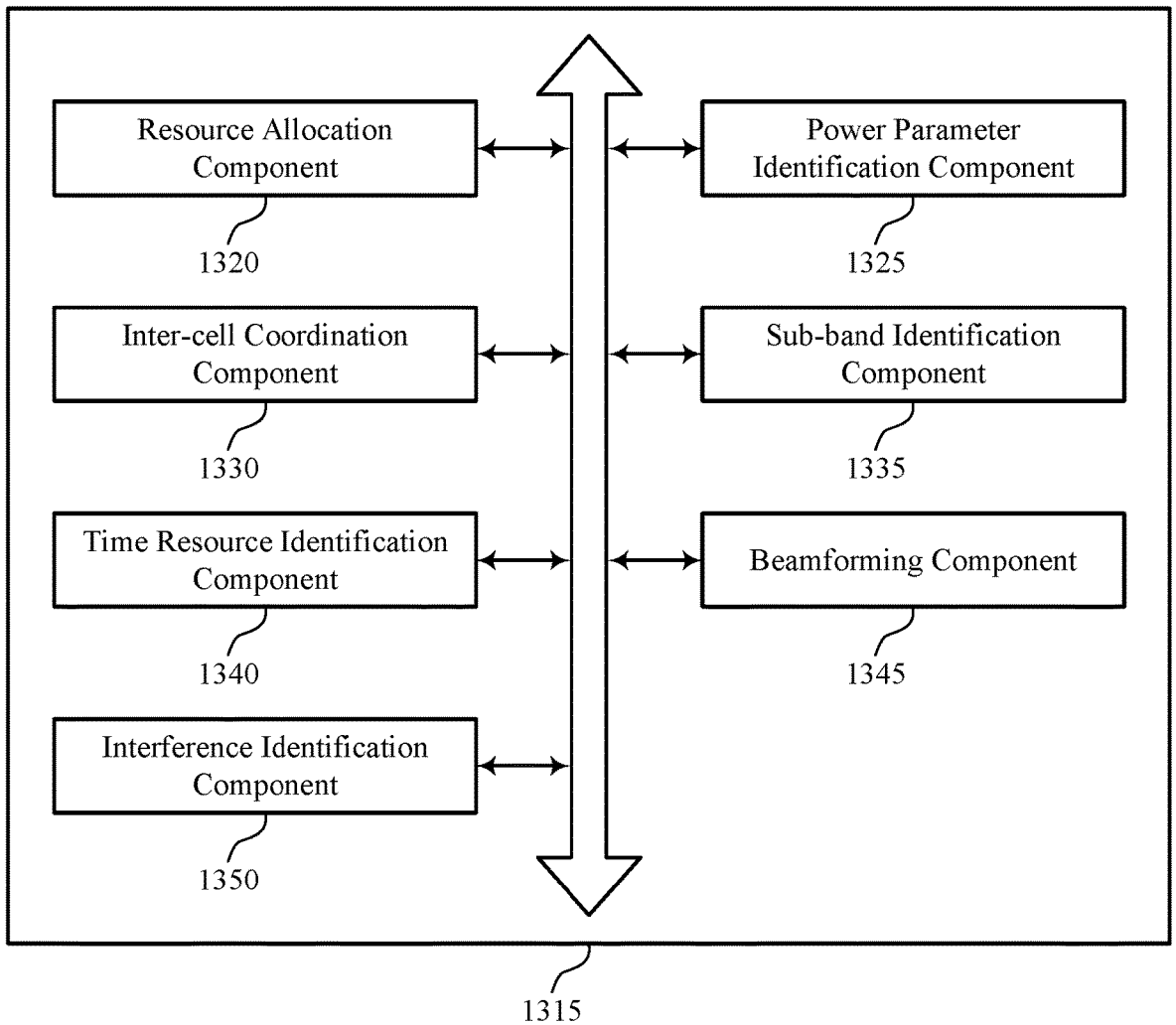
FIG. 13 shows block diagrams of a base station resource manager that supports resource management for low latency wireless communications in accordance with aspects of the present disclosure.

FIG. 13 shows a block diagram 1300 of a base station resource manager 1315 that supports resource management for low latency wireless communications in accordance with aspects of the present disclosure. The base station resource manager 1315 may be an example of aspects of a base station resource manager 1415 as described with reference to FIGS. 11, 12, and 14. The base station resource manager 1315 may include resource allocation component 1320, power parameter identification component 1325, inter-cell coordination component 1330, sub-band identification component 1335, time resource identification component 1340, beamforming component 1345, and interference identification component 1350. Each of these modules may communicate, directly or indirectly, with one another (e.g., via one or more buses).

Resource allocation component 1320 may identify a first set of power parameters associated with a first set of resources for a first set of wireless transmissions, the first set of wireless transmissions having a first duration TTI and identify a second set of power parameters associated with a second set of resources for a second set of wireless transmissions, the second set of wireless transmissions having a second duration TTI that is shorter than the first duration TTI, and the second set of power parameters providing reduced power relative to the first set of power parameters. In some cases, a subset of frequency domain resources are reserved for the second set of wireless transmissions. In some cases, a subset of frequency domain resources include a set of resource blocks. In some cases, the subset of time domain resources are reserved for the second set of wireless transmissions. In some cases, two or more base stations may coordinate the power parameters, and may coordinate uplink and downlink resource pairs for uplink and downlink transmissions of the second set of wireless transmissions between a UE and first base station.

Power parameter identification component 1325 may transmit signaling indicating the first set of power parameters and the second set of power parameters to a UE and apply the second set of power parameters to the third set of resources. In some cases, the coordinating the one or more of the second set of power parameters includes coordinating reduced transmission power for the second set of resources.

Inter-cell coordination component 1330 may coordinate, with one or more neighboring base stations, one or more of the second set of power parameters to mitigate interference and enhance a likelihood of successful reception of one or more transmissions of the second set of wireless transmissions.

Sub-band identification component 1335 may identify one or more sub-bands of frequency resources. In some cases, the coordinating the one or more of the second set of power parameters includes coordinating a subset of frequency domain resources that are available for the second set of wireless transmissions.

Time resource identification component 1340 may identify one or more time domain resources. In some cases, the coordinating the one or more of the second set of power parameters includes coordinating a subset of time domain resources that are available for the second set of wireless transmissions. In some cases, the subset of time domain resources include a set of OFDM symbols or one or more TTIs having the second duration TTI.

Beamforming component 1345 may perform beamforming to transmit downlink transmissions in a particular direction. In some cases, the coordinating the one or more of the second set of power parameters includes coordinating beam directions of the first base station and one or more of the neighboring base stations to be different beam directions.

Interference identification component 1350 may receive one or more CSI reports from the UE and determine that an amount of interference for a third set of resources exceeds a threshold value, which may be used to identify a third set of resources that may be associated with the second set of power parameters.

Figure 14:
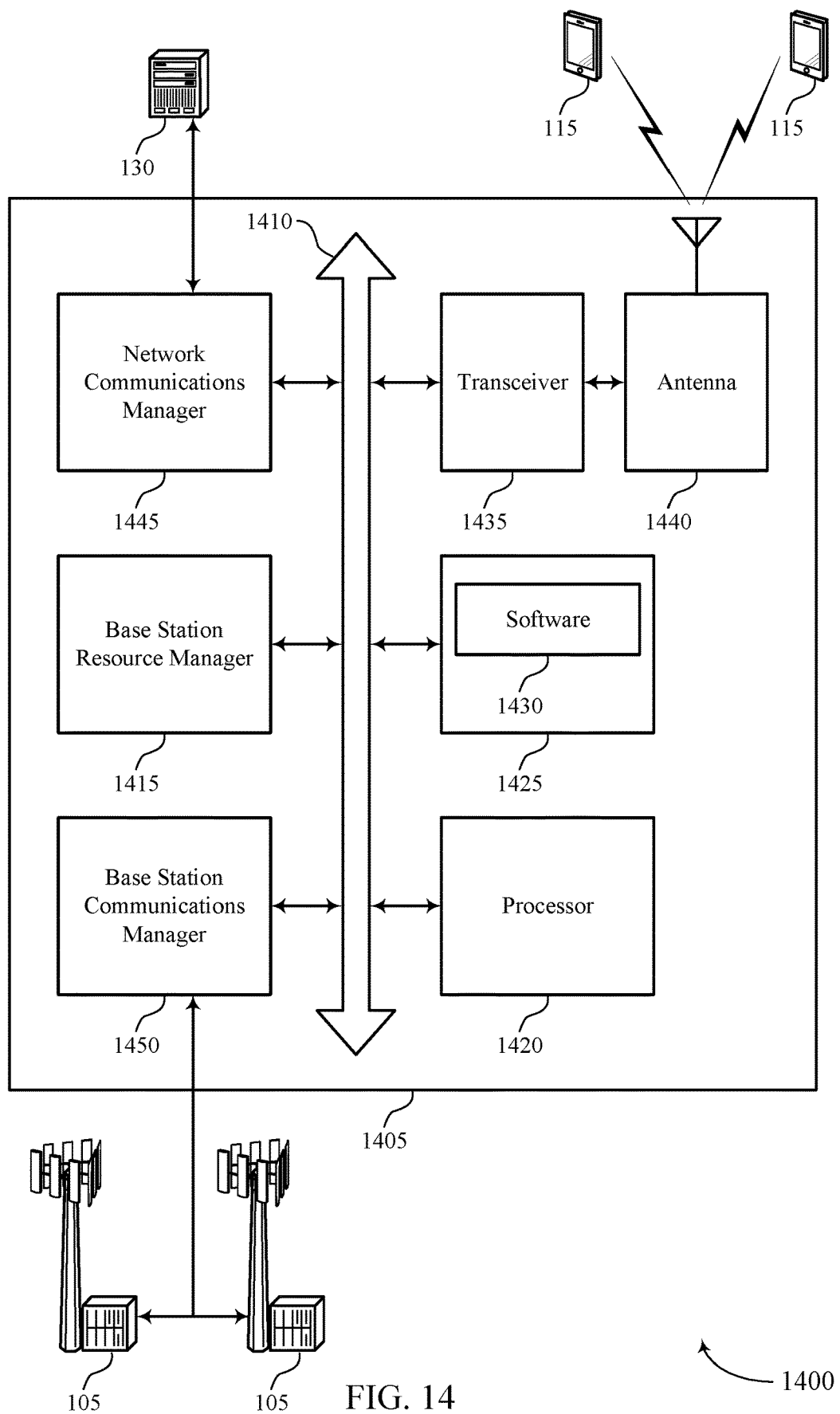
FIG. 14 illustrates a block diagram of a system including a device that supports resource management for low latency wireless communications in accordance with aspects of the present disclosure.

FIG. 14 shows a diagram of a system 1400 including a device 1405 that supports resource management for low latency wireless communications in accordance with various aspects of the present disclosure. Device 1405 may be an example of or include the components of base station 105 as described with reference to FIG. 1. Device 1405 may include components for bi-directional voice and data communications including components for transmitting and receiving communications, including base station resource manager 1415, processor 1420, memory 1425, software 1430, transceiver 1435, antenna 1440, network communications manager 1445, and base station communications manager 1450. These components may be in electronic communication via one or more busses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting resource management for low latency wireless communications).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support resource management for low latency wireless communications. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Base station communications manager 1450 may manage communications with other base station 105, and may include a controller or scheduler for controlling communications with UEs 115 in cooperation with other base stations 105. For example, the base station communications manager 1450 may coordinate scheduling for transmissions to UEs 115 for various interference mitigation techniques such as beamforming or joint transmission. In some examples, base station communications manager 1450 may provide an X2 interface within an Long Term Evolution (LTE)/LTE-A wireless communications network technology to provide communication between base stations 105.

Figure 15:
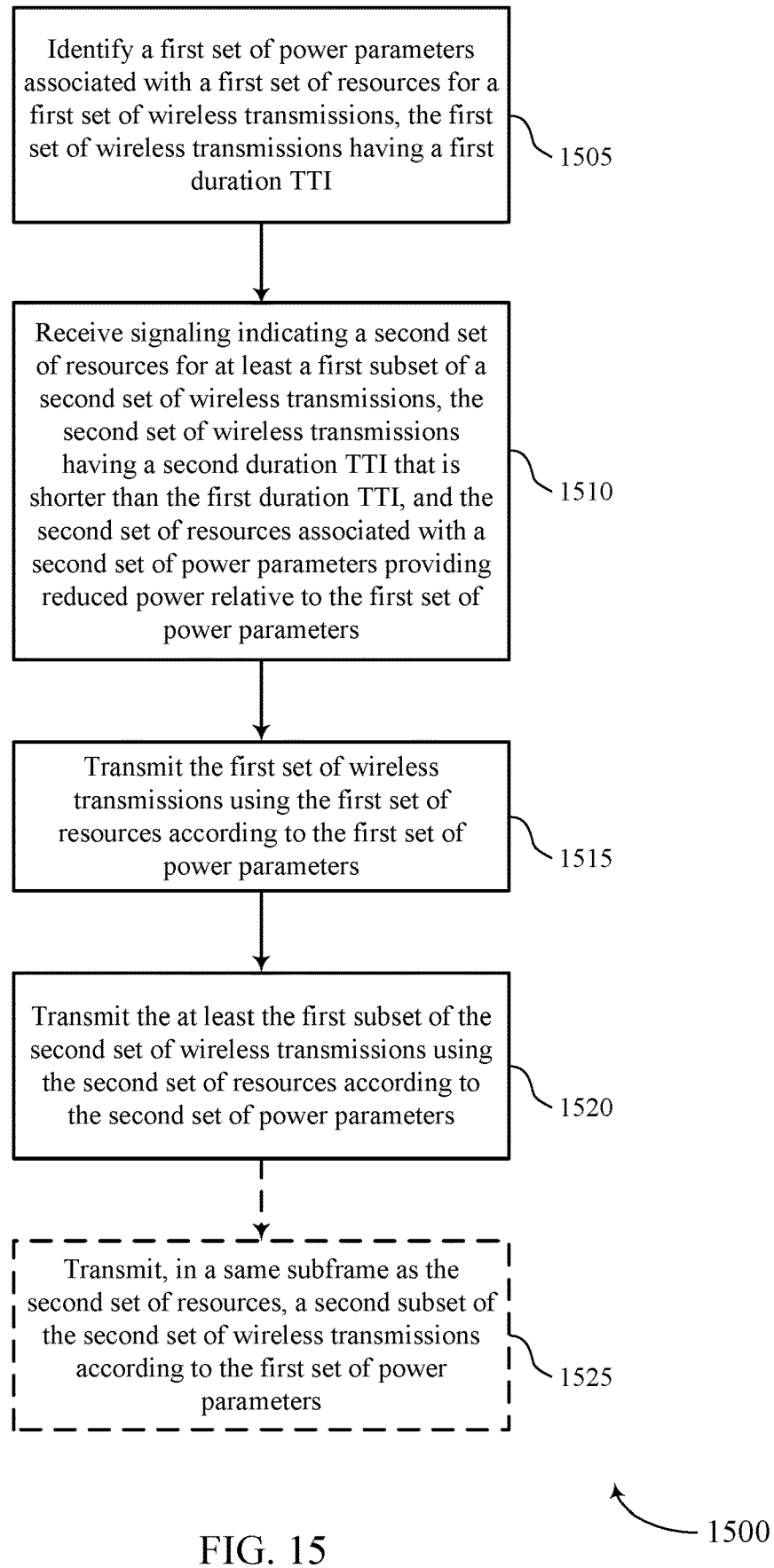
FIGS. 15 through 19 show flowcharts illustrating methods for resource management for low latency wireless communications in accordance with aspects of the present disclosure.

FIG. 15 shows a flowchart illustrating a method 1500 for resource management for low latency wireless communications in accordance with aspects of the present disclosure. The operations of method 1500 may be implemented by a UE 115 or its components as described herein. For example, the operations of method 1500 may be performed by a UE resource manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may identify a first set of power parameters associated with a first set of resources for a first set of wireless transmissions, the first set of wireless transmissions having a first duration TTI. The operations of block 1505 may be performed according to the methods as described with reference to FIGS. 1 through 6. In certain examples, aspects of the operations of block 1505 may be performed by a power parameter identification component as described with reference to FIGS. 7 through 10.

At block 1510 the UE 115 may receive signaling indicating a second set of resources for at least a first subset of a second set of wireless transmissions, the second set of wireless transmissions having a second duration TTI that is shorter than the first duration TTI, and the second set of resources associated with a second set of power parameters providing reduced power relative to the first set of power parameters. The operations of block 1510 may be performed according to the methods as described with reference to FIGS. 1 through 6. In certain examples, aspects of the operations of block 1510 may be performed by a resource allocation component as described with reference to FIGS. 7 through 10.

At block 1515 the UE 115 may transmit the first set of wireless transmissions using the first set of resources according to the first set of power parameters. The operations of block 1515 may be performed according to the methods as described with reference to FIGS. 1 through 6. In certain examples, aspects of the operations of block 1515 may be performed by a transmitter as described with reference to FIGS. 7 through 10.

At block 1520 the UE 115 may transmit the at least the first subset of the second set of wireless transmissions using the second set of resources according to the second set of power parameters. The operations of block 1520 may be performed according to the methods as described with reference to FIGS. 1 through 6. In certain examples, aspects of the operations of block 1520 may be performed by a transmitter as described with reference to FIGS. 7 through 10.

At optional block 1525 the UE 115 may transmit, in a same subframe as the second set of resources, a second subset of the second set of wireless transmissions according to the first set of power parameters. The operations of block 1525 may be performed according to the methods as described with reference to FIGS. 1 through 6. In certain examples, aspects of the operations of block 1525 may be performed by a resource allocation component as described with reference to FIGS. 7 through 10.

Some examples of the method, apparatus, and non-transitory computer-readable medium described above may further include processes, features, means, or instructions for transmitting, in a same subframe as the second set of resources, a second subset of the second set of wireless transmissions according to the first set of power parameters. Some examples of the method, apparatus, and non-transitory computer-readable medium described above may further include processes, features, means, or instructions for receiving signaling indicating the second set of power parameters. In some examples of the method, apparatus, and non-transitory computer-readable medium described above, the signaling comprises cell-specific or UE-specific signaling indicating the second set of power parameters.

In some examples of the method, apparatus, and non-transitory computer-readable medium described above, the first set of resources comprises frequency resources in a first sub-band of an available transmission bandwidth for transmitting the first set of wireless transmissions, the second set of resources comprises frequency resources in a second sub-band of the available transmission bandwidth for transmitting the first set of wireless transmissions or for transmitting the at least the first subset of the second set of wireless transmissions, and wherein the second sub-band may be different than the first sub-band.

In some examples of the method, apparatus, and non-transitory computer-readable medium described above, the second set of resources further comprises a first subset of time resources within the second sub-band for transmitting, using the second set of power parameters, the first set of wireless transmissions or the at least the first subset of the second set of wireless transmissions. In some examples of the method, apparatus, and non-transitory computer-readable medium described above, the first subset of time resources comprise one or more OFDM symbols or one or more TTIs having the second duration TTI. In some examples of the method, apparatus, and non-transitory computer-readable medium described above, the second set of resources further comprises a second subset of time resources within the first sub-band for transmitting the first set of wireless transmissions or the at least the first subset of the second set of wireless transmissions.

Some examples of the method, apparatus, and non-transitory computer-readable medium described above may further include processes, features, means, or instructions for identifying a third set of power parameters associated with the second subset of time resources. In some examples of the method, apparatus, and non-transitory computer-readable medium described above, the first set of resources comprises the first sub-band and a third sub-band of the available transmission bandwidth, and a third set of reserved resources may be identified as available for transmitting only transmissions of the second set of wireless transmissions, the third set of reserved resources comprising a fourth sub-band of the available transmission bandwidth.

Some examples of the method, apparatus, and non-transitory computer-readable medium described above may further include processes, features, means, or instructions for identifying CRS resources that span at least a portion of the first set of resources and the second set of resources, and determining a TPR for the second set of resources based on the first set of power parameters for portions of the second set of resources that overlap the CRS resources and the second set of power parameters for portions of the second set of resources that may be non-overlapping with the CRS resources.

Some examples of the method, apparatus, and non-transitory computer-readable medium described above may further include processes, features, means, or instructions for receiving an allocation of resources that span at least a first portion of the first set of resources and a second portion of the second set of resources, identifying DMRS resources associated with the first portion of the first set of resources and the second portion of the second set of resources, determining a TPR for the first set of resources based on the DMRS resources that overlap the first set of resources being transmitted using the first set of power parameters, and determining the TPR for the second set of resources based on the DMRS resources that overlap the second set of resources being transmitted using the second set of power parameters.

In some examples of the method, apparatus, and non-transitory computer-readable medium described above, the identifying the second set of power parameters comprises one or more of. Some examples of the method, apparatus, and non-transitory computer-readable medium described above may further include processes, features, means, or instructions for identifying a maximum transmit power of the first set of power parameters and applying a reduction to the maximum transmit power for the second set of power parameters. Some examples of the method, apparatus, and non-transitory computer-readable medium described above may further include processes, features, means, or instructions for identifying a first transmit power of the first set of power parameters and applying an offset to the first transmit power to provide a reduced second transmit power of the second set of power parameters. Some examples of the method, apparatus, and non-transitory computer-readable medium described above may further include processes, features, means, or instructions for identifying a first set of open or closed loop power control parameters for the first set of resources, identifying a second set of open or closed loop power control parameters for the second set of resources, and applying the second set of open or closed loop power control parameters to the second set of resources. Some examples of the method, apparatus, and non-transitory computer-readable medium described above may further include processes, features, means, or instructions for identifying a maximum PSD for the first set of resources and the second set of resources and selecting a first transmit power for the first set of resources and a second transmit power for the second set of resources to provide a PSD within the maximum PSD.

In some examples of the method, apparatus, and non-transitory computer-readable medium described above, the first set of wireless transmissions comprises a first uplink transmission from a UE to a base station, and wherein the first set of resources may be selected to provide that the first uplink transmission may be transmitted exclusively using the first set of power parameters. In some examples of the method, apparatus, and non-transitory computer-readable medium described above, the first set of wireless transmissions comprises a first uplink transmission from a UE to a base station, and wherein wireless resources for the first uplink transmission may be selected from both the first set of resources and the second set of resources, and wherein an offset may be applied to a first transmit power of the first set of resources to determine a second transmit power of the second set of resources.

Some examples of the method, apparatus, and non-transitory computer-readable medium described above may further include processes, features, means, or instructions for transmitting the first set of wireless transmissions using the first set of resources and the second set of resources, identifying that data associated with the second set of wireless transmissions are to be transmitted, and puncturing the first set of wireless transmissions with a second transmission of the second set of wireless transmissions.

A method of wireless communications is described. The method may include identifying a first set of power parameters associated with a first set of resources for a first set of wireless transmissions, the first set of wireless transmissions having a first duration TTI, identifying a second set of power parameters associated with a second set of resources for a second set of wireless transmissions, the second set of wireless transmissions having a second duration TTI that is shorter than the first duration TTI, and the second set of power parameters providing reduced power relative to the first set of power parameters, and transmitting signaling indicating the first set of power parameters and the second set of power parameters to a UE.

An apparatus for wireless communications is described. The apparatus may include means for identifying a first set of power parameters associated with a first set of resources for a first set of wireless transmissions, the first set of wireless transmissions having a first duration TTI, means for identifying a second set of power parameters associated with a second set of resources for a second set of wireless transmissions, the second set of wireless transmissions having a second duration TTI that is shorter than the first duration TTI, and the second set of power parameters providing reduced power relative to the first set of power parameters, and means for transmitting signaling indicating the first set of power parameters and the second set of power parameters to a UE.

Another apparatus for wireless communications is described. The apparatus may include a processor, memory in electronic communication with the processor, and instructions stored in the memory. The instructions may be operable to cause the processor to identify a first set of power parameters associated with a first set of resources for a first set of wireless transmissions, the first set of wireless transmissions having a first duration TTI, identify a second set of power parameters associated with a second set of resources for a second set of wireless transmissions, the second set of wireless transmissions having a second duration TTI that is shorter than the first duration TTI, and the second set of power parameters providing reduced power relative to the first set of power parameters, and transmit signaling indicating the first set of power parameters and the second set of power parameters to a UE.

A non-transitory computer readable medium for wireless communications is described. The non-transitory computer-readable medium may include instructions operable to cause a processor to identify a first set of power parameters associated with a first set of resources for a first set of wireless transmissions, the first set of wireless transmissions having a first duration TTI, identify a second set of power parameters associated with a second set of resources for a second set of wireless transmissions, the second set of wireless transmissions having a second duration TTI that is shorter than the first duration TTI, and the second set of power parameters providing reduced power relative to the first set of power parameters, and transmit signaling indicating the first set of power parameters and the second set of power parameters to a UE.

Some examples of the method, apparatus, and non-transitory computer-readable medium described above may further include processes, features, means, or instructions for coordinating, with one or more neighboring base stations, one or more of the second set of power parameters to mitigate interference and enhance a likelihood of successful reception of one or more transmissions of the second set of wireless transmissions. In some examples of the method, apparatus, and non-transitory computer-readable medium described above, the coordinating the one or more of the second set of power parameters comprises coordinating a subset of frequency domain resources that may be available for the second set of wireless transmissions.

In some examples of the method, apparatus, and non-transitory computer-readable medium described above, the subset of frequency domain resources may be reserved for the second set of wireless transmissions. In some examples of the method, apparatus, and non-transitory computer-readable medium described above, the subset of frequency domain resources comprise a set of RBs.

In some examples of the method, apparatus, and non-transitory computer-readable medium described above, the coordinating the one or more of the second set of power parameters comprises coordinating a subset of time domain resources that may be available for the second set of wireless transmissions. In some examples of the method, apparatus, and non-transitory computer-readable medium described above, the subset of time domain resources may be reserved for the second set of wireless transmissions. In some examples of the method, apparatus, and non-transitory computer-readable medium described above, the subset of time domain resources comprise a set of OFDM symbols or one or more TTIs having the second duration TTI.

In some examples of the method, apparatus, and non-transitory computer-readable medium described above, the coordinating the one or more of the second set of power parameters comprises coordinating beam directions of the first base station and one or more of the neighboring base stations to be different beam directions.

In some examples of the method, apparatus, and non-transitory computer-readable medium described above, the coordinating the one or more of the second set of power parameters comprises coordinating uplink and downlink resource pairs for uplink and downlink transmissions of the second set of wireless transmissions between a UE and the first base station. In some examples of the method, apparatus, and non-transitory computer-readable medium described above, the coordinating the one or more of the second set of power parameters comprises coordinating reduced transmission power for the second set of resources.

Some examples of the method, apparatus, and non-transitory computer-readable medium described above may further include processes, features, means, or instructions for receiving one or more CSI reports from the UE, determining that an amount of interference for a third set of resources exceeds a threshold value, and applying the second set of power parameters to the third set of resources.

Figure 16:
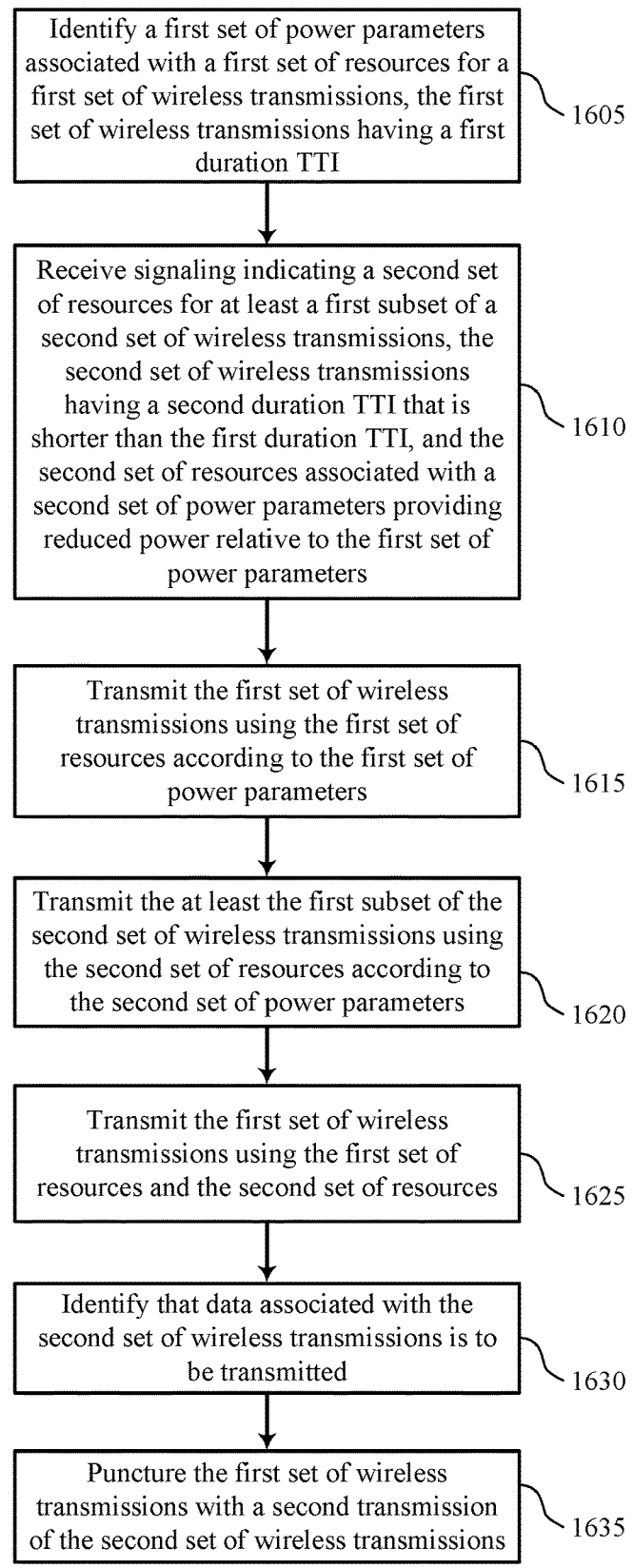

FIG. 16 shows a flowchart illustrating a method 1600 for resource management for low latency wireless communications in accordance with aspects of the present disclosure. The operations of method 1600 may be implemented by a UE 115 or its components as described herein. For example, the operations of method 1600 may be performed by a UE resource manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify a first set of power parameters associated with a first set of resources for a first set of wireless transmissions, the first set of wireless transmissions having a first duration TTI. The operations of block 1605 may be performed according to the methods as described with reference to FIGS. 1 through 6. In certain examples, aspects of the operations of block 1605 may be performed by a power parameter identification component as described with reference to FIGS. 7 through 10.

At block 1610 the UE 115 may receive signaling indicating a second set of resources for at least a first subset of a second set of wireless transmissions, the second set of wireless transmissions having a second duration TTI that is shorter than the first duration TTI, and the second set of resources associated with a second set of power parameters providing reduced power relative to the first set of power parameters. The operations of block 1610 may be performed according to the methods as described with reference to FIGS. 1 through 6. In certain examples, aspects of the operations of block 1610 may be performed by a resource allocation component as described with reference to FIGS. 7 through 10.

At block 1615 the UE 115 may transmit the first set of wireless transmissions using the first set of resources according to the first set of power parameters. The operations of block 1615 may be performed according to the methods as described with reference to FIGS. 1 through 6. In certain examples, aspects of the operations of block 1615 may be performed by a transmitter as described with reference to FIGS. 7 through 10.

At block 1620 the UE 115 may transmit the at least the first subset of the second set of wireless transmissions using the second set of resources according to the second set of power parameters. The operations of block 1620 may be performed according to the methods as described with reference to FIGS. 1 through 6. In certain examples, aspects of the operations of block 1620 may be performed by a transmitter as described with reference to FIGS. 7 through 10.

At block 1625 the UE 115 may transmit the first set of wireless transmissions using the first set of resources and the second set of resources. The operations of block 1625 may be performed according to the methods as described with reference to FIGS. 1 through 6. In certain examples, aspects of the operations of block 1625 may be performed by a resource allocation component as described with reference to FIGS. 7 through 10.

At block 1630 the UE 115 may identify that data associated with the second set of wireless transmissions is to be transmitted. The operations of block 1630 may be performed according to the methods as described with reference to FIGS. 1 through 6. In certain examples, aspects of the operations of block 1630 may be performed by a resource allocation component as described with reference to FIGS. 7 through 10.

At block 1635 the UE 115 may puncture the first set of wireless transmissions with a second transmission of the second set of wireless transmissions. The operations of block 1635 may be performed according to the methods as described with reference to FIGS. 1 through 6. In certain examples, aspects of the operations of block 1635 may be performed by a resource allocation component as described with reference to FIGS. 7 through 10.

Figure 17:
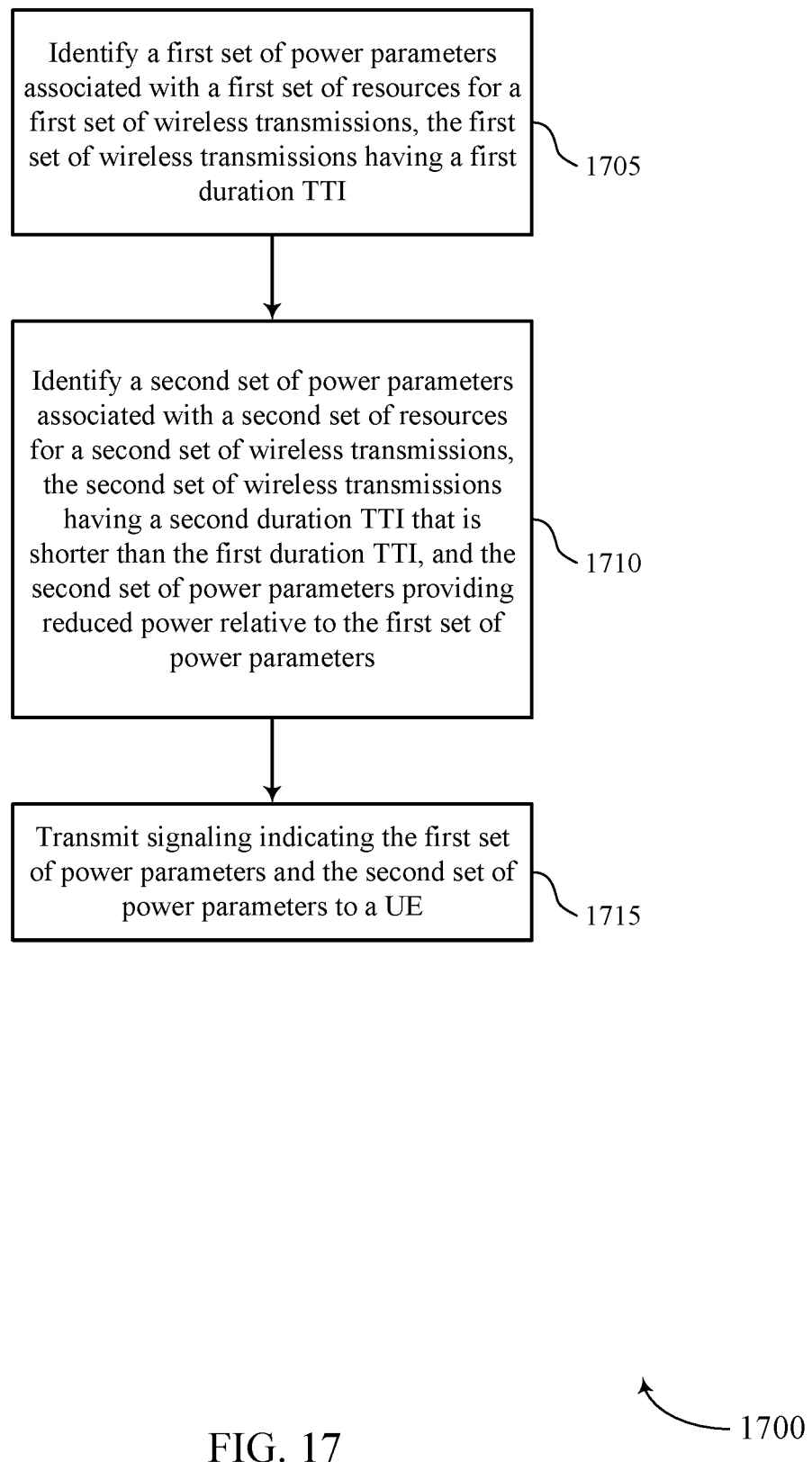

FIG. 17 shows a flowchart illustrating a method 1700 for resource management for low latency wireless communications in accordance with aspects of the present disclosure. The operations of method 1700 may be implemented by a base station 105 or its components as described herein. For example, the operations of method 1700 may be performed by a base station resource manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may identify a first set of power parameters associated with a first set of resources for a first set of wireless transmissions, the first set of wireless transmissions having a first duration TTI. The operations of block 1705 may be performed according to the methods as described with reference to FIGS. 1 through 6. In certain examples, aspects of the operations of block 1705 may be performed by a resource allocation component as described with reference to FIGS. 11 through 14.

At block 1710 the base station 105 may identify a second set of power parameters associated with a second set of resources for a second set of wireless transmissions, the second set of wireless transmissions having a second duration TTI that is shorter than the first duration TTI, and the second set of power parameters providing reduced power relative to the first set of power parameters. The operations of block 1710 may be performed according to the methods as described with reference to FIGS. 1 through 6. In certain examples, aspects of the operations of block 1710 may be performed by a resource allocation component as described with reference to FIGS. 11 through 14.

At block 1715 the base station 105 may transmit signaling indicating the first set of power parameters and the second set of power parameters to a UE. The operations of block 1715 may be performed according to the methods as described with reference to FIGS. 1 through 6. In certain examples, aspects of the operations of block 1715 may be performed by a power parameter identification component as described with reference to FIGS. 11 through 14.

Figure 18:
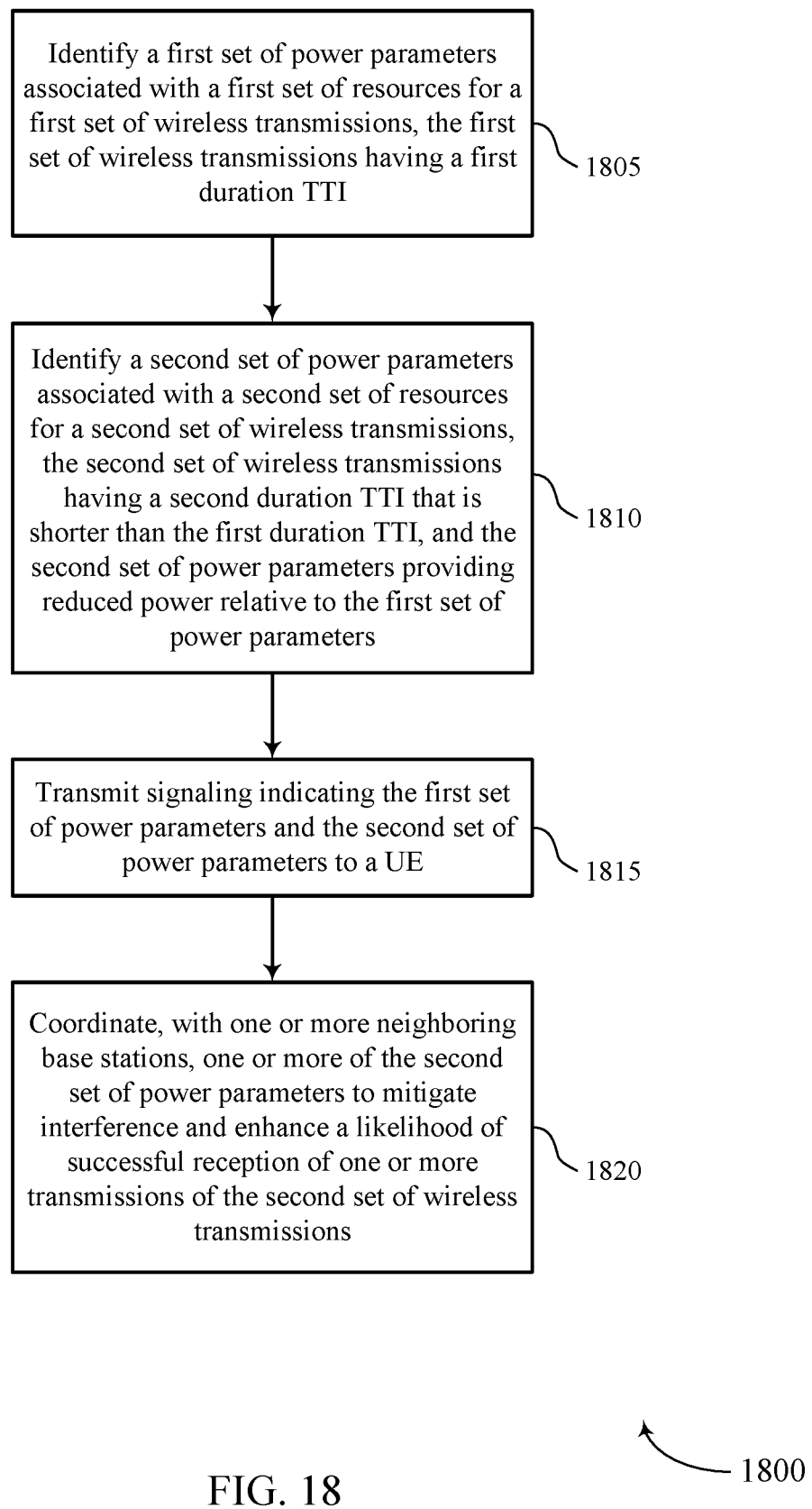

FIG. 18 shows a flowchart illustrating a method 1800 for resource management for low latency wireless communications in accordance with aspects of the present disclosure. The operations of method 1800 may be implemented by a base station 105 or its components as described herein. For example, the operations of method 1800 may be performed by a base station resource manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify a first set of power parameters associated with a first set of resources for a first set of wireless transmissions, the first set of wireless transmissions having a first duration TTI. The operations of block 1805 may be performed according to the methods as described with reference to FIGS. 1 through 6. In certain examples, aspects of the operations of block 1805 may be performed by a resource allocation component as described with reference to FIGS. 11 through 14.

At block 1810 the base station 105 may identify a second set of power parameters associated with a second set of resources for a second set of wireless transmissions, the second set of wireless transmissions having a second duration TTI that is shorter than the first duration TTI, and the second set of power parameters providing reduced power relative to the first set of power parameters. The operations of block 1810 may be performed according to the methods as described with reference to FIGS. 1 through 6. In certain examples, aspects of the operations of block 1810 may be performed by a resource allocation component as described with reference to FIGS. 11 through 14.

At block 1815 the base station 105 may transmit signaling indicating the first set of power parameters and the second set of power parameters to a UE. The operations of block 1815 may be performed according to the methods as described with reference to FIGS. 1 through 6. In certain examples, aspects of the operations of block 1815 may be performed by a power parameter identification component as described with reference to FIGS. 11 through 14.

At block 1820 the base station 105 may coordinate, with one or more neighboring base stations, one or more of the second set of power parameters to mitigate interference and enhance a likelihood of successful reception of one or more transmissions of the second set of wireless transmissions. The operations of block 1820 may be performed according to the methods as described with reference to FIGS. 1 through 6. In certain examples, aspects of the operations of block 1820 may be performed by an inter-cell coordination component as described with reference to FIGS. 11 through 14.

Figure 19:
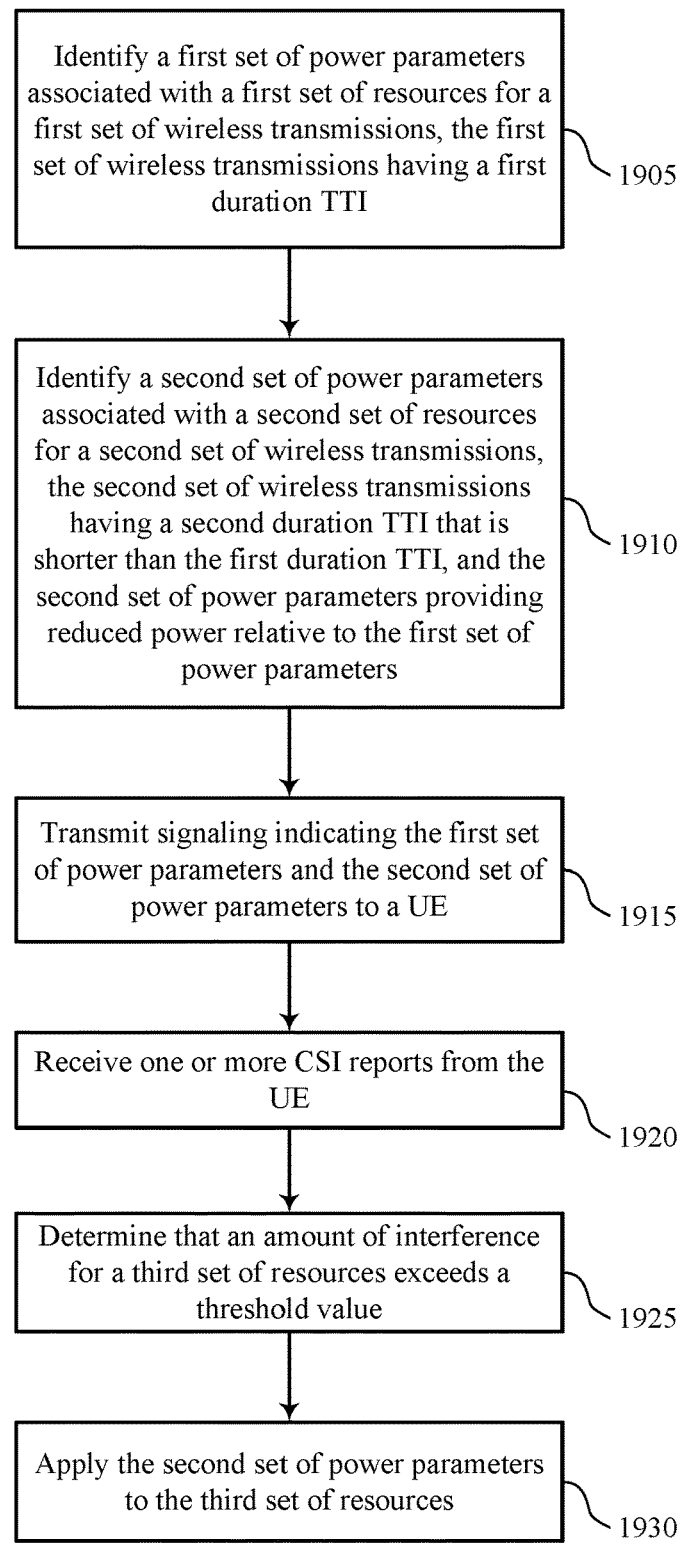

FIG. 19 shows a flowchart illustrating a method 1900 for resource management for low latency wireless communications in accordance with aspects of the present disclosure. The operations of method 1900 may be implemented by a base station 105 or its components as described herein. For example, the operations of method 1900 may be performed by a base station resource manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may identify a first set of power parameters associated with a first set of resources for a first set of wireless transmissions, the first set of wireless transmissions having a first duration TTI. The operations of block 1905 may be performed according to the methods as described with reference to FIGS. 1 through 6. In certain examples, aspects of the operations of block 1905 may be performed by a resource allocation component as described with reference to FIGS. 11 through 14.

At block 1910 the base station 105 may identify a second set of power parameters associated with a second set of resources for a second set of wireless transmissions, the second set of wireless transmissions having a second duration TTI that is shorter than the first duration TTI, and the second set of power parameters providing reduced power relative to the first set of power parameters. The operations of block 1910 may be performed according to the methods as described with reference to FIGS. 1 through 6. In certain examples, aspects of the operations of block 1910 may be performed by a resource allocation component as described with reference to FIGS. 11 through 14.

At block 1915 the base station 105 may transmit signaling indicating the first set of power parameters and the second set of power parameters to a UE. The operations of block 1915 may be performed according to the methods as described with reference to FIGS. 1 through 6. In certain examples, aspects of the operations of block 1915 may be performed by a power parameter identification component as described with reference to FIGS. 11 through 14.

At block 1920 the base station 105 may receive one or more CSI reports from the UE. The operations of block 1920 may be performed according to the methods as described with reference to FIGS. 1 through 6. In certain examples, aspects of the operations of block 1920 may be performed by an interference identification component as described with reference to FIGS. 11 through 14.

At block 1925 the base station 105 may determine that an amount of interference for a third set of resources exceeds a threshold value. The operations of block 1925 may be performed according to the methods as described with reference to FIGS. 1 through 6. In certain examples, aspects of the operations of block 1925 may be performed by an interference identification component as described with reference to FIGS. 11 through 14.

At block 1930 the base station 105 may apply the second set of power parameters to the third set of resources. In some cases, the base station may be and/or one or more neighboring base stations (if coordinated) may modify their transmit power or resource assignments in accordance with the second set of power parameters. The operations of block 1930 may be performed according to the methods as described with reference to FIGS. 1 through 6. In certain examples, aspects of the operations of block 1930 may be performed by a power parameter identification component as described with reference to FIGS. 11 through 14.

In some examples, aspects from two or more of the described methods may be combined. It should be noted that the described methods are just example implementations, and that the operations of the described methods may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 as described with reference to FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a first set of power parameters associated with a first set of resources for a first set of wireless transmissions, the first set of wireless transmissions having a first duration transmission time interval (TTI);
receiving signaling indicating a second set of resources for at least a first subset of a second set of wireless transmissions, the second set of wireless transmissions having a second duration TTI that is shorter than the first duration TTI, and the second set of resources associated with a second set of power parameters providing different power relative to the first set of power parameters;
transmitting the first set of wireless transmissions using the first set of resources according to the first set of power parameters; and
transmitting the at least the first subset of the second set of wireless transmissions using the second set of resources according to the second set of power parameters.

2. The method of claim 1, further comprising transmitting, in a same subframe as the second set of resources, a second subset of the second set of wireless transmissions according to the first set of power parameters.

3. The method of claim 1, further comprising receiving signaling indicating the second set of power parameters.

4. The method of claim 3, wherein the signaling comprises cell-specific or user equipment (UE)-specific signaling indicating the second set of power parameters.

5. The method of claim 1, wherein:
the first set of resources comprises frequency resources in a first sub-band of an available transmission bandwidth for transmitting the first set of wireless transmissions; and
the second set of resources comprises frequency resources in a second sub-band of the available transmission bandwidth for transmitting the first set of wireless transmissions or for transmitting the at least the first subset of the second set of wireless transmissions, and wherein the second sub-band is different than the first sub-band.

6. The method of claim 5, wherein the second set of resources further comprises a first subset of time resources within the second sub-band for transmitting, using the second set of power parameters, the first set of wireless transmissions or the at least the first subset of the second set of wireless transmissions.

7. The method of claim 6, wherein the first subset of time resources comprise one or more orthogonal frequency division multiplexing (OFDM) symbols or one or more TTIs having the second duration TTI.

8. The method of claim 6, wherein the second set of resources further comprises a second subset of time resources within the first sub-band for transmitting the first set of wireless transmissions or the at least the first subset of the second set of wireless transmissions.

9. The method of claim 8, further comprising identifying a third set of power parameters associated with the second subset of time resources.

10. The method of claim 5, wherein the first set of resources comprises the first sub-band and a third sub-band of the available transmission bandwidth, and wherein the method further comprises identifying a third set of reserved resources available for transmitting only transmissions of the second set of wireless transmissions, the third set of reserved resources comprising a fourth sub-band of the available transmission bandwidth.

11. The method of claim 1, further comprising:
identifying cell-specific reference signal (CRS) resources that span at least a portion of the first set of resources and the second set of resources; and determining a traffic-to-pilot ratio (TPR) for the second set of resources based at least in part on the first set of power parameters for portions of the second set of resources that overlap the CRS resources and the second set of power parameters for portions of the second set of resources that are non-overlapping with the CRS resources.

12. The method of claim 1, further comprising:
receiving an allocation of resources that span at least a first portion of the first set of resources and a second portion of the second set of resources;
identifying demodulation reference signal (DMRS) resources associated with the first portion of the first set of resources and the second portion of the second set of resources; and
determining a traffic-to-pilot ratio (TPR) for the first set of resources based at least in part on the DMRS resources that overlap the first set of resources being transmitted using the first set of power parameters, and determining the TPR for the second set of resources based at least in part on the DMRS resources that overlap the second set of resources being transmitted using the second set of power parameters.

13. The method of claim 1, wherein the identifying the second set of power parameters comprises one or more of:
identifying a maximum transmit power of the first set of power parameters and applying a change to the maximum transmit power for the second set of power parameters;
identifying a first transmit power of the first set of power parameters and applying an offset to the first transmit power to provide a different second transmit power of the second set of power parameters;
identifying a first set of open or closed loop power control parameters for the first set of resources, identifying a second set of open or closed loop power control parameters for the second set of resources, and applying the second set of open or closed loop power control parameters to the second set of resources; or
identifying a maximum power spectral density (PSD) for the first set of resources and the second set of resources and selecting a first transmit power for the first set of resources and a second transmit power for the second set of resources to provide a PSD within the maximum PSD.

14. The method of claim 1, wherein the first set of wireless transmissions comprises a first uplink transmission from a user equipment (UE) to a base station, and wherein the first set of resources is selected to provide that the first uplink transmission is transmitted exclusively using the first set of power parameters.

15. The method of claim 1, wherein the first set of wireless transmissions comprises a first uplink transmission from a user equipment (UE) to a base station, and wherein wireless resources for the first uplink transmission are selected from both the first set of resources and the second set of resources, and wherein an offset is applied to a first transmit power of the first set of resources to determine a second transmit power of the second set of resources.

16. The method of claim 1, further comprising:
transmitting the first set of wireless transmissions using the first set of resources and the second set of resources;
identifying that data associated with the second set of wireless transmissions is to be transmitted; and
puncturing the first set of wireless transmissions with a second transmission of the second set of wireless transmissions.

17. A method for wireless communication, comprising:
identifying a first set of power parameters associated with a first set of resources for a first set of wireless transmissions, the first set of wireless transmissions having a first duration transmission time interval (TTI);
identifying a second set of power parameters associated with a second set of resources for a second set of wireless transmissions, the second set of wireless transmissions having a second duration TTI that is shorter than the first duration TTI, and the second set of power parameters providing different power relative to the first set of power parameters; and
transmitting signaling indicating the first set of power parameters and the second set of power parameters to a user equipment (UE).

18. The method of claim 17, wherein the method is performed at a first base station, and wherein the method further comprises coordinating, with one or more neighboring base stations, one or more of the second set of power parameters to mitigate interference and enhance a likelihood of successful reception of one or more transmissions of the second set of wireless transmissions.

19. The method of claim 18, wherein the coordinating the one or more of the second set of power parameters comprises coordinating a subset of frequency domain resources that are available for the second set of wireless transmissions.

20. The method of claim 19, wherein the subset of frequency domain resources are reserved for the second set of wireless transmissions.

21. The method of claim 19, wherein the subset of frequency domain resources comprise a set of resource blocks (RBs).

22. The method of claim 18, wherein the coordinating the one or more of the second set of power parameters comprises coordinating a subset of time domain resources that are available for the second set of wireless transmissions.

23. The method of claim 22, wherein the subset of time domain resources are reserved for the second set of wireless transmissions.

24. The method of claim 22, wherein the subset of time domain resources comprise a set of orthogonal frequency division multiplexing (OFDM) symbols or one or more TTIs having the second duration TTI.

25. The method of claim 18, wherein the coordinating the one or more of the second set of power parameters comprises coordinating beam directions of the first base station and one or more of the neighboring base stations to be different beam directions.

26. The method of claim 18, wherein the coordinating the one or more of the second set of power parameters comprises coordinating uplink and downlink resource pairs for uplink and downlink transmissions of the second set of wireless transmissions between a user equipment (UE) and the first base station.

27. The method of claim 18, wherein the coordinating the one or more of the second set of power parameters comprises coordinating different transmission power for the second set of resources.

28. The method of claim 17, further comprising:
receiving one or more channel state information (CSI) reports from the UE;
determining that an amount of interference for a third set of resources exceeds a threshold value; and
applying the second set of power parameters to the third set of resources.

29. An apparatus for wireless communication, comprising: means for identifying a first set of power parameters associated with a first set of resources for a first set of wireless transmissions, the first set of wireless transmissions having a first duration transmission time interval (TTI); means for receiving signaling indicating a second set of resources for at least a first subset of a second set of wireless transmissions, the second set of wireless transmissions having a second duration TTI that is shorter than the first duration TTI, and the second set of resources associated with a second set of power parameters providing different power relative to the first set of power parameters; means for transmitting the first set of wireless transmissions using the first set of resources according to the first set of power parameters; and
    means for transmitting the at least the first subset of the second set of wireless transmissions using the second set of resources according to the second set of power parameters.

30. The apparatus of claim 29, further comprising means for transmitting, in a same subframe as the second set of resources, a second subset of the second set of wireless transmissions according to the first set of power parameters.

31. The apparatus of claim 29, further comprising means for receiving signaling indicating the second set of power parameters.

32. The apparatus of claim 29, wherein:
    the first set of resources comprises frequency resources in a first sub-band of an available transmission bandwidth for transmitting the first set of wireless transmissions; and
    the second set of resources comprises frequency resources in a second sub-band of the available transmission bandwidth for transmitting the first set of wireless transmissions or for transmitting the at least the first subset of the second set of wireless transmissions, and wherein the second sub-band is different than the first sub-band.

33. The apparatus of claim 29, further comprising:
    means for identifying cell-specific reference signal (CRS) resources that span at least a portion of the first set of resources and the second set of resources; and
    means for determining a traffic-to-pilot ratio (TPR) for the second set of resources based at least in part on the first set of power parameters for portions of the second set of resources that overlap the CRS resources and the second set of power parameters for portions of the second set of resources that are non-overlapping with the CRS resources.

34. The apparatus of claim 29, further comprising:
    means for receiving an allocation of resources that span at least a first portion of the first set of resources and a second portion of the second set of resources;
    means for identifying demodulation reference signal (DMRS) resources associated with the first portion of the first set of resources and the second portion of the second set of resources; and
    means for determining a traffic-to-pilot ratio (TPR) for the first set of resources based at least in part on the DMRS resources that overlap the first set of resources being transmitted using the first set of power parameters, and determining the TPR for the second set of resources based at least in part on the DMRS resources that overlap the second set of resources being transmitted using the second set of power parameters.

35. The apparatus of claim 29, wherein the first set of wireless transmissions comprises a first uplink transmission from a user equipment (UE) to a base station, and wherein the first set of resources is selected to provide that the first uplink transmission is transmitted exclusively using the first set of power parameters.

36. The apparatus of claim 29, wherein the first set of wireless transmissions comprises a first uplink transmission from a user equipment (UE) to a base station, and wherein wireless resources for the first uplink transmission are selected from both the first set of resources and the second set of resources, and wherein an offset is applied to a first transmit power of the first set of resources to determine a second transmit power of the second set of resources.

37. The apparatus of claim 29, further comprising:
    means for transmitting the first set of wireless transmissions using the first set of resources and the second set of resources;
    means for identifying that data associated with the second set of wireless transmissions is to be transmitted; and
    means for puncturing the first set of wireless transmissions with a second transmission of the second set of wireless transmissions.

38. An apparatus for wireless communication, comprising: means for identifying a first set of power parameters associated with a first set of resources for a first set of wireless transmissions, the first set of wireless transmissions having a first duration transmission time interval (TTI); means for identifying a second set of power parameters associated with a second set of resources for a second set of wireless transmissions, the second set of wireless transmissions having a second duration TTI that is shorter than the first duration TTI, and the second set of power parameters providing different power relative to the first set of power parameters; and means for transmitting signaling indicating the first set of power parameters and the second set of power parameters to a user equipment (UE).

39. The apparatus of claim 38, wherein the means for the method is performed at a first base station, and wherein the method further comprises means for coordinating, with one or more neighboring base stations, one or more of the second set of power parameters to mitigate interference and enhance a likelihood of successful reception of one or more transmissions of the second set of wireless transmissions.

40. The apparatus of claim 39, wherein the coordinating the one or more of the second set of power parameters comprises coordinating a subset of frequency domain resources that are available for the second set of wireless transmissions.

41. The apparatus of claim 39, wherein the coordinating the one or more of the second set of power parameters comprises coordinating beam directions of the first base station and one or more of the neighboring base stations to be different beam directions.

42. The apparatus of claim 39, wherein the coordinating the one or more of the second set of power parameters comprises coordinating uplink and downlink resource pairs for uplink and downlink transmissions of the second set of wireless transmissions between a user equipment (UE) and the first base station.

43. The apparatus of claim 39, wherein the coordinating the one or more of the second set of power parameters comprises coordinating different transmission power for the second set of resources.

44. The apparatus of claim 38, further comprising:
    means for receiving one or more channel state information (CSI) reports from the UE;
    means for determining that an amount of interference for a third set of resources exceeds a threshold value; and means for applying the second set of power parameters to the third set of resources.

45. An apparatus for wireless communication, comprising: a processor; memory in electronic communication with the processor; and instructions stored in the memory and executable by the processor to cause the apparatus to:
identify a first set of power parameters associated with a first set of resources for a first set of wireless transmissions, the first set of wireless transmissions having a first duration transmission time interval (TTI);
receive signaling indicating a second set of resources for at least a first subset of a second set of wireless transmissions, the second set of wireless transmissions having a second duration TTI that is shorter than the first duration TTI, and the second set of resources associated with a second set of power parameters providing different power relative to the first set of power parameters;
transmit the first set of wireless transmissions using the first set of resources according to the first set of power parameters; and
transmit the at least the first subset of the second set of wireless transmissions using the second set of resources according to the second set of power parameters.

46. The apparatus of claim 45, wherein the instructions are further executable by the processor to cause the apparatus to transmit, in a same subframe as the second set of resources, a second subset of the second set of wireless transmissions according to the first set of power parameters.

47. The apparatus of claim 45, wherein the instructions are further executable by the processor to cause the apparatus to receive signaling indicating the second set of power parameters.

48. The apparatus of claim 45, wherein:
the first set of resources comprises frequency resources in a first sub-band of an available transmission bandwidth for transmitting the first set of wireless transmissions; and
the second set of resources comprises frequency resources in a second sub-band of the available transmission bandwidth for transmitting the first set of wireless transmissions or for transmitting the at least the first subset of the second set of wireless transmissions, and wherein the second sub-band is different than the first sub-band.

49. The apparatus of claim 45, wherein the instructions are further executable by the processor to cause the apparatus to:
identify cell-specific reference signal (CRS) resources that span at least a portion of the first set of resources and the second set of resources; and
determine a traffic-to-pilot ratio (TPR) for the second set of resources based at least in part on the first set of power parameters for portions of the second set of resources that overlap the CRS resources and the second set of power parameters for portions of the second set of resources that are non-overlapping with the CRS resources.

50. The apparatus of claim 45, wherein the instructions are further executable by the processor to cause the apparatus to:
receive an allocation of resources that span at least a first portion of the first set of resources and a second portion of the second set of resources;
identify demodulation reference signal (DMRS) resources associated with the first portion of the first set of resources and the second portion of the second set of resources; and
determine a traffic-to-pilot ratio (TPR) for the first set of resources based at least in part on the DMRS resources that overlap the first set of resources being transmitted using the first set of power parameters, and determining the TPR for the second set of resources based at least in part on the DMRS resources that overlap the second set of resources being transmitted using the second set of power parameters.

51. The apparatus of claim 45, wherein the first set of wireless transmissions comprises a first uplink transmission from a user equipment (UE) to a base station, and wherein the first set of resources is selected to provide that the first uplink transmission is transmitted exclusively using the first set of power parameters.

52. The apparatus of claim 45, wherein the first set of wireless transmissions comprises a first uplink transmission from a user equipment (UE) to a base station, and wherein wireless resources for the first uplink transmission are selected from both the first set of resources and the second set of resources, and wherein an offset is applied to a first transmit power of the first set of resources to determine a second transmit power of the second set of resources.

53. The apparatus of claim 45, wherein the instructions are further executable by the processor to cause the apparatus to:
transmit the first set of wireless transmissions using the first set of resources and the second set of resources;
identify that data associated with the second set of wireless transmissions is to be transmitted; and
puncture the first set of wireless transmissions with a second transmission of the second set of wireless transmissions.

54. An apparatus for wireless communication, comprising: a processor; memory in electronic communication with the processor; and instructions stored in the memory and executable by the processor to cause the apparatus to:
identify a first set of power parameters associated with a first set of resources for a first set of wireless transmissions, the first set of wireless transmissions having a first duration transmission time interval (TTI);
identify a second set of power parameters associated with a second set of resources for a second set of wireless transmissions, the second set of wireless transmissions having a second duration TTI that is shorter than the first duration TTI, and the second set of power parameters providing different power relative to the first set of power parameters; and
transmit signaling indicating the first set of power parameters and the second set of power parameters to a user equipment (UE).

55. The apparatus of claim 54, wherein the instructions to the method is performed at a first base station, and wherein the method further are executable by the processor to cause the apparatus to coordinate, with one or more neighboring base stations, one or more of the second set of power parameters to mitigate interference and enhance a likelihood of successful reception of one or more transmissions of the second set of wireless transmissions.

56. The apparatus of claim 55, wherein the coordinating the one or more of the second set of power parameters comprises coordinating a subset of frequency domain resources that are available for the second set of wireless transmissions.

57. The apparatus of claim 55, wherein the coordinating the one or more of the second set of power parameters comprises coordinating beam directions of the first base station and one or more of the neighboring base stations to be different beam directions.

58. The apparatus of claim 55, wherein the coordinating the one or more of the second set of power parameters comprises coordinating uplink and downlink resource pairs for uplink and downlink transmissions of the second set of wireless transmissions between a user equipment (UE) and the first base station.

59. The apparatus of claim 55, wherein the coordinating the one or more of the second set of power parameters comprises coordinating different transmission power for the second set of resources.

60. The apparatus of claim 54, wherein the instructions are further executable by the processor to cause the apparatus to:
   receive one or more channel state information (CSI) reports from the UE;
   determine that an amount of interference for a third set of resources exceeds a threshold value; and
   apply the second set of power parameters to the third set of resources.

61. A non-transitory computer-readable medium storing code for wireless communications, the code comprising instructions executable to:
   identify a first set of power parameters associated with a first set of resources for a first set of wireless transmissions, the first set of wireless transmissions having a first duration transmission time interval (TTI);
   receive signaling indicating a second set of resources for at least a first subset of a second set of wireless transmissions, the second set of wireless transmissions having a second duration TTI that is shorter than the first duration TTI, and the second set of resources associated with a second set of power parameters providing different power relative to the first set of power parameters;
   transmit the first set of wireless transmissions using the first set of resources according to the first set of power parameters; and
   transmit the at least the first subset of the second set of wireless transmissions using the second set of resources according to the second set of power parameters.

62. A non-transitory computer-readable medium storing code for wireless communications, the code comprising instructions executable to:
   identify a first set of power parameters associated with a first set of resources for a first set of wireless transmissions, the first set of wireless transmissions having a first duration transmission time interval (TTI);
   identify a second set of power parameters associated with a second set of resources for a second set of wireless transmissions, the second set of wireless transmissions having a second duration TTI that is shorter than the first duration TTI, and the second set of power parameters providing different power relative to the first set of power parameters; and
   transmit signaling indicating the first set of power parameters and the second set of power parameters to a user equipment (UE).

* * * * *